(12) United States Patent
Kirino et al.

(10) Patent No.: US 7,209,746 B1
(45) Date of Patent: Apr. 24, 2007

(54) APPARATUS AND METHOD FOR WIRELESS VIDEO AND AUDIO TRANSMISSION UTILIZING A MINUTE-POWER LEVEL WAVE

(75) Inventors: Hideki Kirino, Ayauta-gun (JP); Tetsuo Hiraga, Niihama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/423,356

(22) PCT Filed: Mar. 31, 1999

(86) PCT No.: PCT/JP99/01682

§ 371 (c)(1),
(2), (4) Date: Jun. 21, 2000

(87) PCT Pub. No.: WO99/52287

PCT Pub. Date: Oct. 14, 1999

(30) Foreign Application Priority Data

Mar. 31, 1998 (JP) .................. 10-085706

(51) Int. Cl.
*G04Q 7/20* (2006.01)

(52) U.S. Cl. .................. 455/450; 455/3; 455/5.1; 455/11.1; 455/42; 370/384; 395/200.77; 386/104

(58) Field of Classification Search ............... 455/5.1, 455/11.1, 42, 450, 3; 398/67, 68, 66; 386/104, 386/124, 95, 125; 725/118, 119, 148, 149, 725/150, 121–123, 87, 91, 95; 348/723; 370/384; 395/200.77

See application file for complete search history.

(56) References Cited

U.S. PATENT DOCUMENTS

| | | | | |
|---|---|---|---|---|
| 5,038,402 A | * | 8/1991 | Robbins | 455/3 |
| 5,751,707 A | * | 5/1998 | Voit et al. | 370/384 |
| 5,761,437 A | * | 6/1998 | Takano | 395/200.77 |
| 5,793,413 A | * | 8/1998 | Hylton et al. | 348/12 |
| 5,794,116 A | * | 8/1998 | Matsuda et al. | 455/5.1 |
| 6,091,932 A | * | 7/2000 | Langlais | 455/5.1 |
| 6,259,443 B1 | * | 7/2001 | Williams, Jr. | 345/329 |
| 6,282,366 B1 | * | 8/2001 | Oguro et al. | 386/104 |

FOREIGN PATENT DOCUMENTS

| | | |
|---|---|---|
| JP | 62-56031 | 3/1987 |
| JP | 2-156744 | 6/1990 |
| JP | 3-145365 | 6/1991 |
| JP | 4-326887 | 11/1992 |
| JP | 7-029100 | 1/1995 |
| JP | 7-221711 | 8/1995 |
| JP | 8-139653 | 5/1996 |
| JP | 9-27951 | 1/1997 |
| JP | 9-163355 | 6/1997 |
| JP | 9-186690 | 7/1997 |
| JP | 10-23392 | 1/1998 |

* cited by examiner

*Primary Examiner*—Joseph Feild
*Assistant Examiner*—Pierre-Louis Desir
(74) *Attorney, Agent, or Firm*—Steptoe & Johnson LLP

(57) ABSTRACT

The present invention is to provide an inexpensive transmission apparatus which has the function of receiving standard television broadcasting, uses a minute-power wave, and is able to coexist with future digital television broadcasting or mobile communication equipment which will use the same frequency band as that of the transmission apparatus.

By using an RF converter 102 and an RF tuner 118 which are adapted to a standard television signal, available frequencies within the reception band are detected, and the use frequency is rapidly changed to spread the spectrum, thereby performing communication by the minute-power wave.

4 Claims, 8 Drawing Sheets

1 : master station
2 : relay station
3 : slave station
4,5 : terminals

1101 : body of each station
1102 : station selection/video audio demodulation circuit
1103 : high-frequency video modulation circuit
1104 : high-frequency audio modulation circuit
1105 : control circuit
1106 : transmission/reception antenna

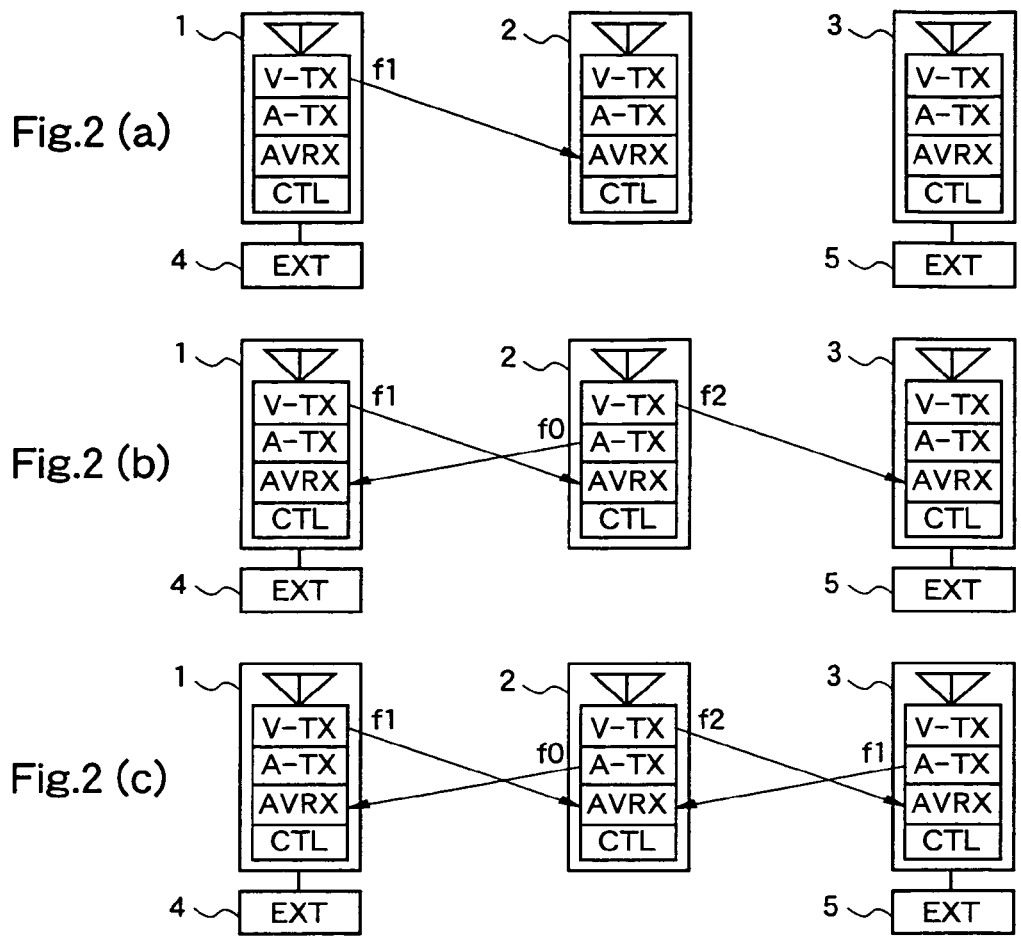
Fig.2 (a)
Fig.2 (b)
Fig.2 (c)
Fig.3
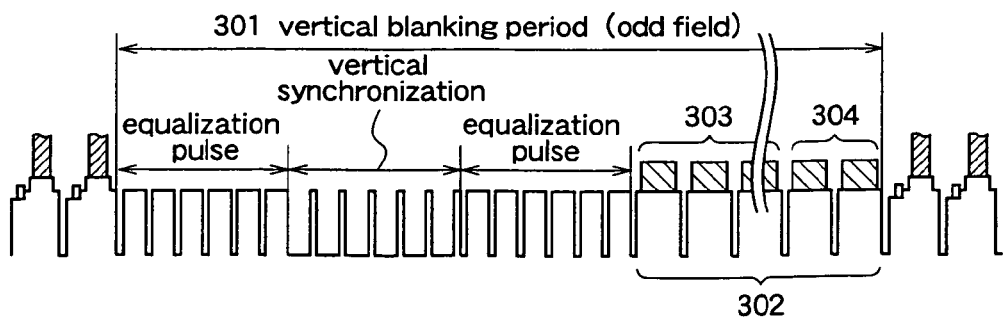

524(211A,211B,225A,225B,212A,212B,227A,227B) : output stop means
523(219A,219B,203A,203B,225A,225B,211A,211B,212A,212B) : retransmission means
522(203A,203B,225A,225B,211A,211B,212A,212B) : frequency setting means
520(207A,207B,211A,211B,212A,212B) : ID storage means
521(206A,206B,207A,207B,211A,211B,212A,212B) : ID inquiry/registration means
510(211A,212A) : frequency changing order control means
511(211A,212A) : communication control means
512(211A,212A,214A,225A,216A) : communication frequency list updation means received image according to conventional example received image according to embodiment 2 of invention received image according to embodiment 3 of invention

APPARATUS AND METHOD FOR WIRELESS VIDEO AND AUDIO TRANSMISSION UTILIZING A MINUTE-POWER LEVEL WAVE

TECHNOLOGICAL FIELD

The present invention relates to a transmission apparatus and a transmission method for transmitting video and audio between apparatuses which are connected by wireless, utilizing a wave of minute-power level.

Particularly, the present invention relates to a transmission apparatus and a transmission method, which enable transmission of information between apparatuses which are placed apart from each other by a distance longer than the reachable range of the minute-power wave.

Furthermore, the present invention relates to a transmission apparatus and a transmission method, which have the function of receiving NTSC system standard television broadcasting, reduce the influence of multi-path, enable high-definition audio transmission and highly efficient performance, and realize a communication distance longer than that in the case of using a single frequency.

Furthermore, the present invention relates to a transmission apparatus and a transmission method, which realize duplex video transmission and solve the influence of multi-path.

Moreover, the present invention relates to a transmission apparatus and a transmission method which solve radio interference and prevent interception, in the case where a plurality of apparatuses are used simultaneously in a multiple dwelling house or the like where the use wave areas may overlap uncertainly.

BACKGROUND ART

To date, as for video signal transmission in a front-door visual phone or the like, cable transmission using coaxial cables or parallel cables has been adopted. However, because of the facility of fitting work, adoption of a wireless video transmission system, in which a parent unit and a child unit are connected by utilizing a radio wave, is considered.

Further, as a method for receiving standard television broadcasting as well as performing wireless video transmission, there has been studied a method in which one channel is selected from vacant channels of a television and video is transmitted by utilizing a minute-power wave. This method uses an RF converter for generating a standard television signal and an RF tuner for receiving the standard television signal.

Further, as another means, there has been studied a method in which an RF tuner is used for receiving broadcasting, and a digitized video signal is transmitted by using a small-power radio transmitter-receiver, in combination with the data compression/decompression technique.

FIG. 11 shows a video transmission device as an example of a conventional transmission apparatus using a minute-power wave.

In FIG. 11, 801 denotes a transmitter for transmitting a video signal, 809 denotes a video source for outputting the video signal to the transmitter 801, 802 denotes an RF converter for generating a standard television signal, 803 denotes a channel switch for selecting a transmission frequency of the RF converter 802, and 804 denotes a transmission antenna of the transmitter 801. Further, 805 denotes a receiver for receiving the video signal, 806 denotes a receiving antenna of the receiver 805, 807 denotes an RF tuner for receiving the standard television signal, 808 denotes a video reproduction circuit for reproducing the video signal demodulated by the RF tuner 807, and 810 denotes a display unit for displaying the video from the receiver 805.

Next, the operation will be described. In the above-described structure, in the transmitter 801, a frequency signal selected by the channel switch 803 is modulated with the video signal from the video source 809 by the RF converter 802. Then, in the transmitter 801, the modulated signal is transmitted through the transmission antenna 804. On the other hand, in the receiver 805, the video reproduction circuit 808 reproduces the video signal from the signal selectively received by the receiving antenna 806 and the RF tuner 807, and the display unit 810 displays the video.

In such wireless transmission utilizing a radio wave, since the wave is a limited resource, it is appropriate to utilize a minute-power wave in a place where the available range is limited, such as in a house. The minute-power wave is a wave which hardly affect a wireless apparatus such as a television receiver in a house. However, the reachable range of the minute-power wave is short and, therefore, the distance between a parent unit and a child unit which use the minute-power wave is unfavorably limited.

The present invention is made to solve the above-described technological problem of the conventional apparatus, and it is an object of the present invention to provide a transmission apparatus which can establish a transmission path between a master station and a slave station, such as a parent unit and a child unit, which are placed apart by a distance longer than the reachable range of a minute-power wave.

Further, in the conventional transmission apparatus, since the transmission power is at the minute-power level and the reception sensitivity is low even in short-distance transmission, the influence of multi-path is considerable.

Furthermore, there is a risk that the minute-power radio apparatus using the frequency band of the standard television broadcasting will adversely affect reception of existing television broadcasting. Moreover, the minute-power radio apparatus will become unavailable when being affected by a strong existing broadcast wave.

Furthermore, in order to implement the above-described method in which an RF tuner is used for receiving broadcasting and a digitized video signal is transmitted using a small-power radio transmitter-receiver in combination with the data compression/decompression technique, the following apparatuses are required: an RF tuner, an AD converter, a DA converter, a compression/decompression processing circuit, a small-power wireless transmitter, and a small-power wireless receiver. Therefore, it is difficult to realize this method in regard to cbst.

The present invention is made to solve the above-described problems of the conventional apparatus, and it is an object of the present invention to provide a transmission apparatus which hardly become unavailable due to the influence of an existing broadcast wave even when it transmits information by using the frequency band of the standard television broadcasting, and which can be easily realized in regard to cost, and a transmission method using the transmission apparatus.

DISCLOSURE OF THE INVENTION

In order to solve the above-described problems, the invention described in Aspect 1 comprises a master station transmitting video or audio by utilizing a minute-power wave; a slave station transmitting video or audio by utilizing a minute-power wave; and a relay station placed between the master station and the slave station which are placed apart from each other by a distance longer than the reachable range of the minute-power wave; wherein a transmission signal from the master station includes, in addition to original information such as video or audio, information indicating the address of the slave station, and information indicating a frequency at which the self-station receives a signal from the relay station; the relay station modulates the frequency of the minute-power wave received from the master station to a different frequency and outputs it; the relay station transmits information about a frequency at which the self-station receives a signal from the slave station; and when the slave station recognizes that the transmission signal is a signal directed to the self-station, it modulates the minute-power wave to the frequency specified by the relay station and transmits the video or audio, thereby establishing a transmission path between the master station and the slave station.

This invention enables transmission of video or audio by utilizing a minute-power wave, even when the distance between the master station and the slave station exceeds the reachable range of the minute-power wave.

Further, according to the invention described in aspect 2, in the transmission apparatus described in aspect 1, a standard television signal is used as the transmission signal in the forward path from the master station to the slave station; and a PCM audio signal and the information indicating the address of the slave station and the reception frequency specified by the self-station are superposed on a video signal during the vertical blanking period of the video signal.

This invention enables transmission of video or audio by utilizing a minute-power wave, even when the distance between the master station and the slave station exceeds the reachable range of the minute-power wave.

Further, the invention described in aspect 3 comprises a transmitter having an RF converter which generates a standard television signal; a receiver having an RF tuner which receives the standard television signal; available frequency detection means for detecting frequencies which can be used for video transmission, within the reception band of the RF tuner, in advance of use; detected frequency registration means for registering the detected frequencies, as a communication frequency list, in both of the transmitter and the receiver; and spread spectrum communication means for spreading the power spectrum by changing the frequency within the range of the communication frequency list, and performing spread spectrum communication.

This invention can provide a video transmission apparatus which has the function of receiving NTSC system standard television broadcasting, reduces the influence of multi-path, enables high-definition audio transmission and highly efficient performance, realizes a longer communication distance than that in the case of using a single frequency, and is able to coexist with digital television broadcasting or mobile communication equipment which will use the same frequency band in the future.

Further, according to the invention of aspect 4, the transmission apparatus described in aspect 3 includes transmission power control means for automatically changing the transmission power during the communication in accordance with the use frequency band width so as to keep the power density per unit band width constant.

This invention can provide a video transmission apparatus which has the function of receiving NTSC system standard television broadcasting, reduces the influence of multi-path, enables high-definition audio transmission and highly efficient performance, realizes a longer communication distance than that in the case of using a single frequency, and is able to coexist with digital television broadcasting or mobile communication equipment which will use the same frequency band in the future.

Further, according to the invention described in aspect 5, the transmission apparatus described in aspects 3 or 4 includes frequency changing means for changing the frequency during the communication, in synchronization with the synchronous timing of the video signal.

This invention can provide a video transmission apparatus which has the function of receiving NTSC system standard television broadcasting, reduces the influence of multi-path, enables high-definition audio transmission and highly efficient performance, realizes a longer communication distance than that in the case of using a single frequency, and is able to coexist with digital television broadcasting or mobile communication equipment which will use the same frequency band in the future.

Further, according to the invention described in aspect 6, the transmission apparatus described in any of aspects 3 to 5 includes control signal superposition and transmission means for transmitting a control signal by superposing it on the video signal in the blanking period, during the communication.

This invention can provide a video transmission apparatus which has the function of receiving NTSC system standard television broadcasting, reduces the influence of multi-path, enables highly efficient performance, realizes a longer communication distance than that in the case of using a single frequency, and is able to coexist with digital television broadcasting or mobile communication equipment which will use the same frequency band in the future.

Further, according to the invention described in aspect 7, the transmission apparatus described in any of aspects 3 to 6 includes audio signal superposition and transmission means for subjecting an audio signal to PCM, and transmitting the PCM audio signal by superposing it on the video signal in the blanking period, during the communication.

This invention can provide a video transmission apparatus which has the function of receiving NTSC system standard television broadcasting, reduces the influence of multi-path, enables high-definition audio transmission, realizes a longer communication distance than that in the case of using a single frequency, and is able to coexist with digital television broadcasting or mobile communication equipment which will use the same frequency band in the future.

Further, the invention described in aspect 8 comprises first and second transmission/reception apparatuses each comprising a transmission apparatus described in any of aspects 3 to 7; frequency changing order control means for controlling the frequency changing order, during the communication, in such a manner that the frequency is changed in one direction, from the higher frequency to the lower frequency or from the lower frequency to the higher frequency, within the range of the communication frequency list, and when the frequency reaches the end of the frequency list, it is returned to the beginning of the frequency list; and communication control means for controlling the first and second transmission/reception apparatuses to realize duplex communication, by using a frequency time table in which the first and second transmission/reception apparatuses always use different frequencies.

This invention can provide a video transmission apparatus which realizes duplex video transmission, and reduces the influence of multi-path.

Further, according to the invention described in aspect 9, the transmission apparatus described in aspect 8 includes communication frequency list update means which uses the previously registered communication frequency list when starting the communication, and uses a second communication frequency list obtained by duplicating the communication frequency list after the communication has been started, and updates the second communication frequency list as desired by exchanging the result of communication, i.e., whether it is good or bad, between the first and second transmission/reception apparatuses.

This invention can provide a video transmission apparatus which realizes duplex video transmission, and solves the influence of multi-path.

Further, according to the invention described in aspect 10, the transmission apparatus described in any of aspects 3 to 9 includes ID storage means for storing an identification number (hereinafter referred to as an ID) which is given to the transmission apparatus during manufacture; and ID inquiry and registration means for performing mutual inquiry of IDs with another transmission apparatus which is permitted to have communication in advance of use, and registering the ID.

This invention can provide a video transmission apparatus which solves radio interference and prevents interception, in a multiple dwelling house in which the use wave areas may overlap uncertainly.

Further, according to the invention described in aspect 11, the transmission apparatus described in aspect 10 includes frequency setting means which always executes the reception mode in advance of the transmission mode to detect the frequency time tables of all other transmission apparatuses which are performing transmission within the same wave area, and performs transmission by using a frequency time table the use frequency of which is always different from those of these other transmission apparatuses; and retransmission means for performing retransmission by using a frequency time table different from the frequency time table when a transmission signal from another apparatus which has requested communication cannot be detected even when a predetermined period of time has passed after starting the transmission mode.

This invention can provide a video transmission apparatus which solves radio interference and prevents interception, in a multiple dwelling house in which the use wave areas may overlap uncertainly.

Further, according to the invention described in aspect 12, the transmission apparatus described in aspects 10 or 11 includes output stop means for stopping output of the original information such as audio or video, when the ID which is permitted to have communication cannot be confirmed in the reception mode.

This invention can provide a video transmission apparatus which solves radio interference and prevents interception, in a multiple dwelling house in which the use wave areas may overlap uncertainly.

Further, the invention described in aspect 13 is a transmission method for mutually transmitting video or audio between a master station and a slave station by utilizing a minute-power wave. In this method, a relay station is placed between the master station and the slave station which are placed apart from each other by a distance longer than the reachable range of the minute-power wave; a transmission signal from the master station includes, in addition to original information such as video or audio, information indicating the address of the slave station, and information indicating a frequency at which the self-station receives a signal from the relay station; the relay station modulates the frequency of the minute-power wave received from the master station to a different frequency and outputs it; the relay station transmits information about a frequency at which the self-station receives a signal from the slave station; and when the slave station recognizes that the transmission signal is a signal directed to the self-station, it modulates the minute-power wave to the frequency specified by the relay station and transmits the video or audio, thereby establishing a transmission path between the master station and the slave station.

This invention enables transmission of video or audio by utilizing a minute-power wave, even when the distance between the master station and the slave station exceeds the reachable range of the minute-power wave.

Further, according to the invention described in aspect 14, in the transmission method described in aspect 13, a standard television signal is used as the transmission signal in the forward path from the master station to the slave station; and a PCM audio signal and the information indicating the destination station and the reception frequency specified by the self-station are superposed on a video signal during the vertical blanking period of the video signal.

This invention enables transmission of video or audio by utilizing a minute-power wave, even when the distance between the master station and the slave station exceeds the reachable range of the minute-power wave.

Further, the invention described in aspect 15 is a transmission method for performing transmission between a transmitter having an RF converter which generates a standard television signal, and a receiver having an RF tuner which receives the standard television signal. In this method, in advance of use, frequencies which can be used for video transmission are detected within the reception band of the RF tuner; the detected frequencies are registered, as a communication frequency list, in both of the transmitter and the receiver; and the power spectrum is spread by changing the frequency within the range of the communication frequency list, thereby performing spread spectrum communication.

This invention can provide a video transmission method which has the function of receiving NTSC system standard television broadcasting, reduces the influence of multi-path, enables high-definition audio transmission and highly efficient performance, realizes a longer communication distance than that in the case of using a single frequency, and is able to coexist with digital television broadcasting or mobile communication equipment which will use the same frequency band in the future.

Further, according to the invention described in aspect 16, in the transmission method described in aspect 15, the transmission power during the communication is automatically changed in accordance with the use frequency band width so as to keep the power density per unit band width constant.

This invention can provide a video transmission method which has the function of receiving NTSC system standard television broadcasting, reduces the influence of multi-path, enables high-definition audio transmission and highly efficient performance, realizes a longer communication distance than that in the case of using a single frequency, and is able to coexist with digital television broadcasting or mobile communication equipment which will use the same frequency band in the future.

Further, according to the invention described in aspect 17, in the transmission method described in aspects 15 or 16, the frequency during the communication is changed in synchronization with the synchronous timing of the video signal.

This invention can provide a video transmission method which has the function of receiving NTSC system standard television broadcasting, reduces the influence of multi-path, enables high-definition audio transmission and highly efficient performance, realizes a longer communication distance than that in the case of using a single frequency, and is able to coexist with digital television broadcasting or mobile communication equipment which will use the same frequency band in the future.

Further, according to the invention described in aspect 18, in the transmission method described in any of aspects 15 to 17, during the communication, a control signal is transmitted by superposing it on the video signal in the blanking period.

This invention can provide a video transmission method which has the function of receiving NTSC system standard television broadcasting, reduces the influence of multi-path, enables highly efficient performance, realizes a longer communication distance than that in the case of using a single frequency, and is able to coexist with digital television broadcasting or mobile communication equipment which will use the same frequency band in the future.

Further, according to the invention described in aspect 19, in the transmission method described in any of aspects 15 to 18, during the communication, an audio signal is subjected to PCM, and the PCM audio signal is transmitted by superposing it on the video signal in the blanking period.

This invention can provide a video transmission method which has the function of receiving NTSC system standard television broadcasting, reduces the influence of multi-path, enables high-definition audio transmission, realizes a longer communication distance than that in the case of using a single frequency, and is able to coexist with digital television broadcasting or mobile communication equipment which will use the same frequency band in the future.

Further, the invention described in aspect 20 is a transmission method, wherein each of first and second transmission/reception apparatuses performs a transmission method described in any of aspects 15 to 19; during the communication, the frequency changing order is controlled in such a manner that the frequency is changed in one direction, from the higher frequency to the lower frequency or from the lower frequency to the higher frequency, within the range of the communication frequency list, and when the frequency reaches the end of the frequency list, it is returned to the beginning of the frequency list; and the first and second transmission/reception apparatuses are controlled to realize duplex communication, by using a frequency time table in which the first and second transmission/reception apparatuses always use different frequencies.

This invention provides a video transmission method which realizes duplex video communication and reduces the influence of multi-path.

Further, according to the invention described in aspect 21, in the transmission method described in aspect 20, the previously registered communication frequency list is used when starting the communication and, after the communication has been started, a second communication frequency list obtained by duplicating the communication frequency list is used, and the second communication frequency list is updated as desired by exchanging the result of communication, i.e., whether it is good or bad, between the first and second transmission/reception apparatuses.

This invention provides a video transmission method which realizes duplex video communication and solves the influence of multi-path.

Further, according to the invention described in aspect 22, in the transmission method described in any of aspects 15 to 21, an identification number (hereinafter referred to as an ID) given to the transmission apparatus during manufacture is stored; and in advance of use, mutual inquiry of IDs is performed with another transmission apparatus which is permitted to have communication, and the ID is registered.

This invention can provide a video transmission method which solves radio interference and prevents interception, in a multiple dwelling house in which the use wave areas may overlap uncertainly.

Further, according to the invention described in aspect 23, in the transmission method described in aspect 22, the reception mode is always performed in advance of the transmission mode to detect the frequency time tables of all other transmission apparatuses which are performing transmission within the same wave area, and transmission is performed by using a frequency time table the use frequency of which is always different from those of these other transmission apparatuses; and when a transmission signal from another apparatus which has requested communication cannot be detected even when a predetermined period of time has passed after starting the transmission mode, retransmission is performed by using a frequency time table different from the frequency time table.

This invention can provide a video transmission method which solves radio interference and prevents interception, in a multiple dwelling house in which the use wave areas may overlap uncertainly.

Further, according to the invention described in aspect 24, in the transmission method described in aspects 22 or 23, when the ID which is permitted to have communication cannot be confirmed in the reception mode, the original information such as audio or video is not output.

This invention can provide a video transmission method which solves radio interference and prevents interception, in a multiple dwelling house in which the use wave areas may overlap uncertainly.

BRIEF DESCRIPTION OF THE DRAWINGS

FIG. 1(*b*) is a block diagram illustrating the respective stations of the transmission apparatus.

FIG. 2 is a diagram for explaining the operation with respect to the manner of establishing a transmission path in the transmission apparatus.

FIG. 3 is a diagram illustrating the waveform of a modulation signal in the transmission apparatus.

BEST MODE TO EXECUTE THE INVENTION

Embodiment 1

In a first embodiment of the invention, a relay station for relaying transmission of a video signal or an audio signal is placed between a master station and a slave station, such as a parent unit and a child unit, which are placed apart by a distance longer than the reachable range of a minute-power wave, thereby establishing a transmission path by the minute-power wave.

This first embodiment corresponds to the inventions which are described in aspects 1 and 2 and aspects 13 and 14 of this application.

Hereinafter, the first embodiment of the present invention will be described with reference to the drawings. In this first embodiment, a front-door visual phone is employed as an example. That is, in this transmission apparatus, visitor's image and speech taken by a child unit at the front door are transmitted to a parent unit in a room, and only a speech is transmitted from the parent unit, thereby performing mutual communication.

Figure 1:
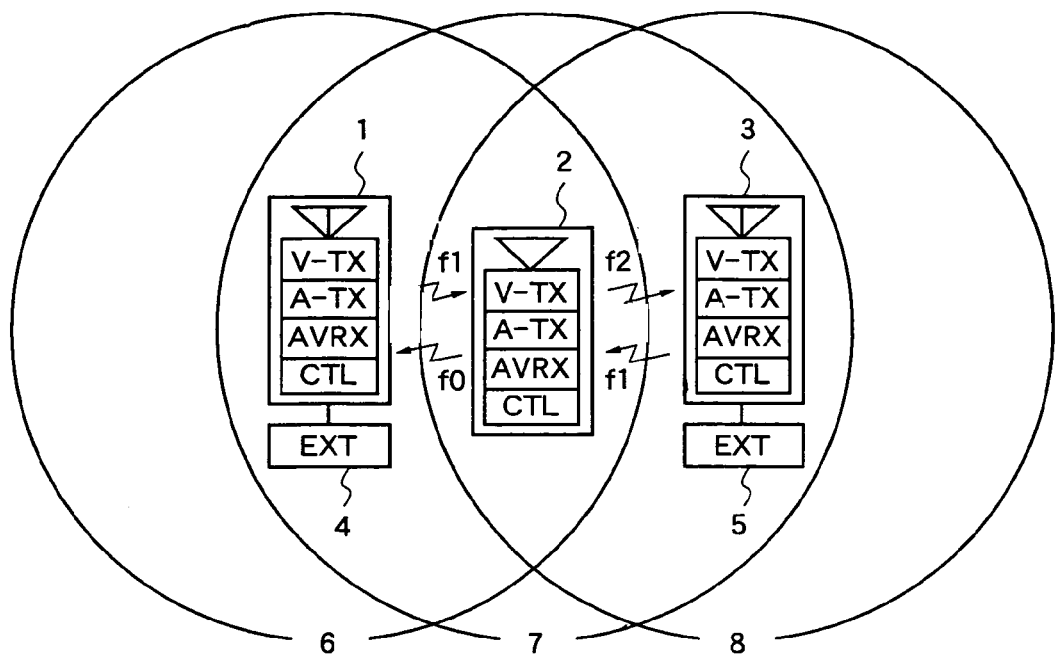
FIG. 1(*a*) is a diagram illustrating the structure of a transmission apparatus according to a first embodiment of the present invention.
Figure 1:
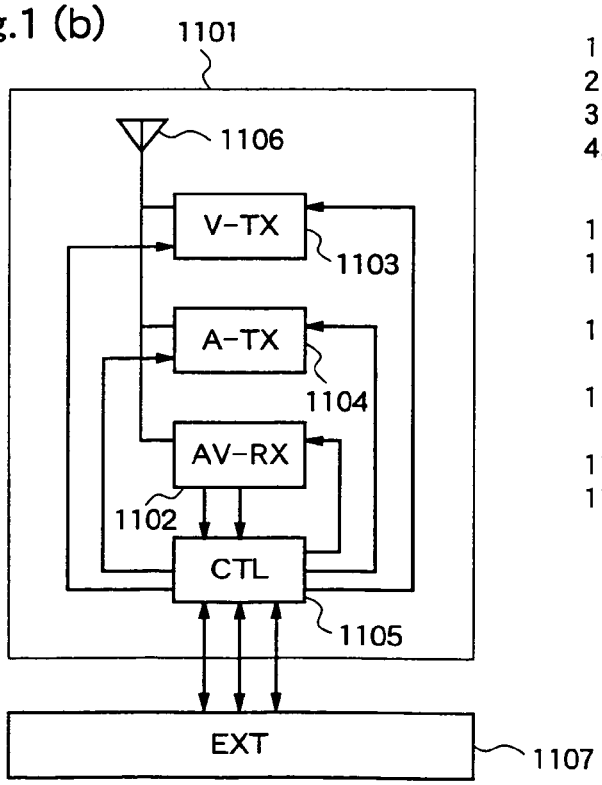

FIG. 1(*a*) is a diagram illustrating the structure of the transmission apparatus according to the first embodiment of the present invention, and FIG. 1(*b*) is a block diagram for explaining the circuit structure of each station in the transmission apparatus.

In FIG. 1(*a*), numeral 1 denotes a master station as a child unit placed at the front door, and numeral 4 denotes a terminal connected to the master station 1, which includes a camera for taking the image of the visitor, and a mike and a speaker for a conversation with the resident in a room. Numeral 2 denotes a relay station. Since the relay station 2 is placed in a passage or the like, it is not provided with a terminal for inputting and outputting the image and the speech. Numeral 3 denotes a slave station as a parent unit placed in a room, and numeral 5 denotes a terminal connected to the slave station 3, which includes a monitor for displaying the visitor, and a mike and a speaker for a conversation between the visitor and the resident in the room.

Further, numeral 6 denotes the reachable range of the minute-power wave from the master station 1, and the relay station 2 is arranged within this range. Numeral 7 denotes the reachable range of the minute-power wave output from the relay station 2, and the master station 1 and the slave station 3 are arranged within this range. Numeral 8 denotes the reachable range of the minute-power wave output from the slave station, and the relay station 2 is arranged within this range.

Next, the operation will be described. The respective stations 1, 2, and 3 perform transmission and reception at different frequencies. To be specific, the master station 1 transmits a signal for calling the slave station 3, from the terminal 4, at a frequency f1. At this time, the master station 1 specifies that the reception frequency of the self-station is f0. The relay station 2 modulates the received calling signal to a frequency f2 which is different from f1, and outputs it.

At this time, the relay station 2 adds information indicating that the reception frequency of the self-station is f1. Further, the slave station 3 receives the calling signal of the frequency f2 and outputs it to the terminal 5.

Then, the slave station 3 outputs a response signal from the terminal 5 at the frequency f1 specified by the relay station 2. When the relay station 2 receives the response signal of the reception frequency specified by the self-station, the relay station 2 modulates this to the frequency specified by the master station 1 and outputs it. When this signal is received by the master station 1, a transmission path is established.

FIG. 3 shows an example of a modulation signal transmitted from the master station 1 as a child unit to the slave station 3 as a parent unit. This is obtained by superposing a PCM audio signal 303 and a system control signal 304 on a video signal used in a standard television, in a horizontal scanning period 302 in a vertical blanking period 301 of an odd field of the video signal. The PCM audio signal 303 includes audio information from the terminal 4 of the master station 1. The system control signal 304 includes destination information indicating that the station 3 having the terminal 5 is the slave station, and information about the reception frequency of the self-station.

FIG. 1(*b*) is a block diagram illustrating the circuit of each station. A body 1101 of each station comprises a station selection/video audio demodulation circuit 1102 for demodulating a video or audio signal supplied from another station, and specifying the reception frequency of the self-station; a high-frequency video modulation circuit for modulating a video signal in which an audio signal and a system control signal are superposed; a high-frequency audio modulation circuit for modulating an audio signal; a control circuit 1105 for controlling frequency change in each circuit, and controlling exchange of a video signal, an audio signal, and a control signal between the body 1101 of each station and a terminal 1107 connected to the body; and a transmission/reception antenna 1106. 1107 denotes a terminal for outputting a video signal, an audio signal, and a control signal for controlling the apparatus, to each station body 1101 and, conversely, receiving a video signal, an audio signal, and a control signal from each station body 1101, but the relay station 2 is not provided with this terminal 1107 as described above.

Hereinafter, the manner of successively extending the transmission path to be established will be described in detail by using FIG. 2.

Initially, in the stage where the master station 1 does not emit a wave, each station operates the station selection/video and audio demodulation circuit 1102. Each station monitors a predetermined frequency range while scanning as to whether a wave is emitted from another station or not. At the same time, the master station 1 observes as to whether a transmission request is output from the terminal 4 connected thereto or not.

In the first stage shown in FIG. 2(*a*), when video and audio signals and a transmission request from the terminal 4 are input to the master station 1, the master station 1 transmits the high-frequency signal of the frequency f1 which is modulated by the modulation signal shown in FIG. 3. As described above, in this signal, information indicating the slave station 3 and information indicating the reception frequency of the self-station is f0 are added (superposed). As for these frequencies f1 and f0, frequencies which are not used by other radio apparatuses and have less noises are selected in advance, according to the result of the frequency monitoring which has been performed until receiving the transmission request.

The reason why the audio information from the terminal 4 is superposed as a PCM audio signal in the video signal for transmission is because usually the frequency for audio transmission used in a standard television is used for return transmission of the relay station 2.

Therefore, in the forward path, the frequency for the audio transmission is transmitted without being modulated.

On the other hand, the relay station 2 which has monitored as to whether a wave is emitted from another station or not, receives the wave of the frequency f1 transmitted from the master station 1 because the relay station 2 is placed within the reachable range of the wave from the master station 1. At this time, the slave station 3 does not receive the wave because it is not within the reachable range of the wave from the master station 1.

Next, in the second stage shown in FIG. 2(b), the relay station 2 knows, as the result of demodulating the received wave, that the destination station is not the self-station. So, the relay station 2 adds information indicating that the reception frequency of the self-station is f1 to the system control signal on the demodulated video signal to obtain a modulation signal. Then, the relay station 2 modulates this modulation signal at the frequency f2 and transmits it. This transmission frequency f2 is selected according to the result of monitoring the frequency.

In addition, the relay station 2 knows that the master station 1 uses the frequency f0 for reception and so this frequency f0 must be used for the return path. So, the relay station 2 modulates the demodulated audio signal obtained by reception to the frequency f0 and transmits it, thereby establishing the return path.

On the other hand, the slave station 3 which has monitored as to whether a wave is emitted from another station or not, receives the wave of the frequency f2 transmitted from the relay station 2 because it is placed within the reachable range of the wave from the relay station 2.

In the third stage shown in FIG. 2(c), the slave station 3 knows, as the result of demodulating the received signal, that the destination is the terminal 5 connected to the self-station. So, the slave station 3 demodulates the audio from the PCM audio signal on the received video signal, and extracts the control signal of the terminal 5 from the system control signal, thereby separating these signals from the video signal and, thereafter, outputs these control signal, video signal, and audio signal to the terminal 5.

Furthermore, the slave station 3 knows that the relay station 2 is in the receiving state at the frequency f1 and so the frequency f1 must be used for the return path. So, the slave station 3 modulates the response signal indicating that video transmission has been normally performed, by using an audio outside the audible range, and superposes the audio signal from the terminal 5 on this audio signal outside the audible range to obtain a modulation signal. Then, the slave station 3 modulates this modulation signal at the frequency f1 and transmits it.

Since the relay station 2 receiving the wave of the frequency f1 has already established the return path at the frequency f0, the response signal and the audio signal from the slave station 3 can be immediately transmitted to the master station 1 at the frequency f0. Then, the master station 1 separates the response signal and the audio signal from the wave supplied from the relay station 2, whereby the master station 1 continues monitoring, from the response signal, that the video transmission is normally carried on, and receives the audio signal from the terminal 5. As the result, bidirectional audio transmission is realized.

As described above, according to the first embodiment of the invention, the signal to be transmitted from the master station includes, besides video and audio, information indicating the destination station to which the signal is directed, and information indicating the frequency at which the self-station receives a signal from the relay station. The relay station modulates the signal from the master station to a frequency different from the reception frequency and outputs it. At this time, the relay station adds information indicating the frequency at which the self-station receives the signal from the slave station, to the signal to be transmitted. When the slave station recognizes that the transmission signal is a signal directed to the self-station, it modulates the video or audio signal to the frequency specified by the relay station, and transmits the signal. The relay station transmits this signal successively to the master station, whereby the transmission path between the master station and the slave station can be established even when the distance between the master station 1 as a child unit and the slave station 3 as a parent unit exceeds the reachable range of the minute-power wave. Thereby, half duplex transmission is realized for the video while full duplex transmission is realized for the audio, and transmission of the system control signal is realized.

While in this first embodiment the transmission apparatus includes only one relay station, when the number of relay stations is increased and the relay stations are successively placed within the reachable range of the minute-power wave, the distance between the master station and the slave station can be further increased.

In this first embodiment, one-directional transmission from the child unit to the parent unit is described with respect to the video signal. However, since the forward path and the return path are inverted by interchanging the use frequency of the high-frequency video modulation circuit and the use frequency of the high-frequency audio modulation circuit, when the interchange of the use frequencies is performed at high speed, bidirectional simultaneous transmission of video can be performed apparently.

Further, while in this first embodiment the relay station is provided with no terminal, when the number of relay stations is increased and the relay stations are provided with terminals, the master station and the slave station are not fixed, and a transmission path can be established between arbitrary stations.

Further, while in this first embodiment a front-door visual phone is taken as an example to explain the terminal, the terminal can be applied to a video camera, a VTR, a portable visual phone, and the like.

Furthermore, while in this first embodiment a digitized audio signal is subjected to PCM, other compressive coding methods may be used.

Embodiment 2

In this second embodiment, information can be transmitted without being affected by multi-path even when using a minute-power wave, by performing spread frequency communication.

Hereinafter, the second embodiment of the invention will be described by using FIGS. 4, 6, 7, 8, and 9 and table 1. This second embodiment corresponds to the inventions described in aspects 3 to 7 and aspects 15 to 19 of this application.

Figure 4:
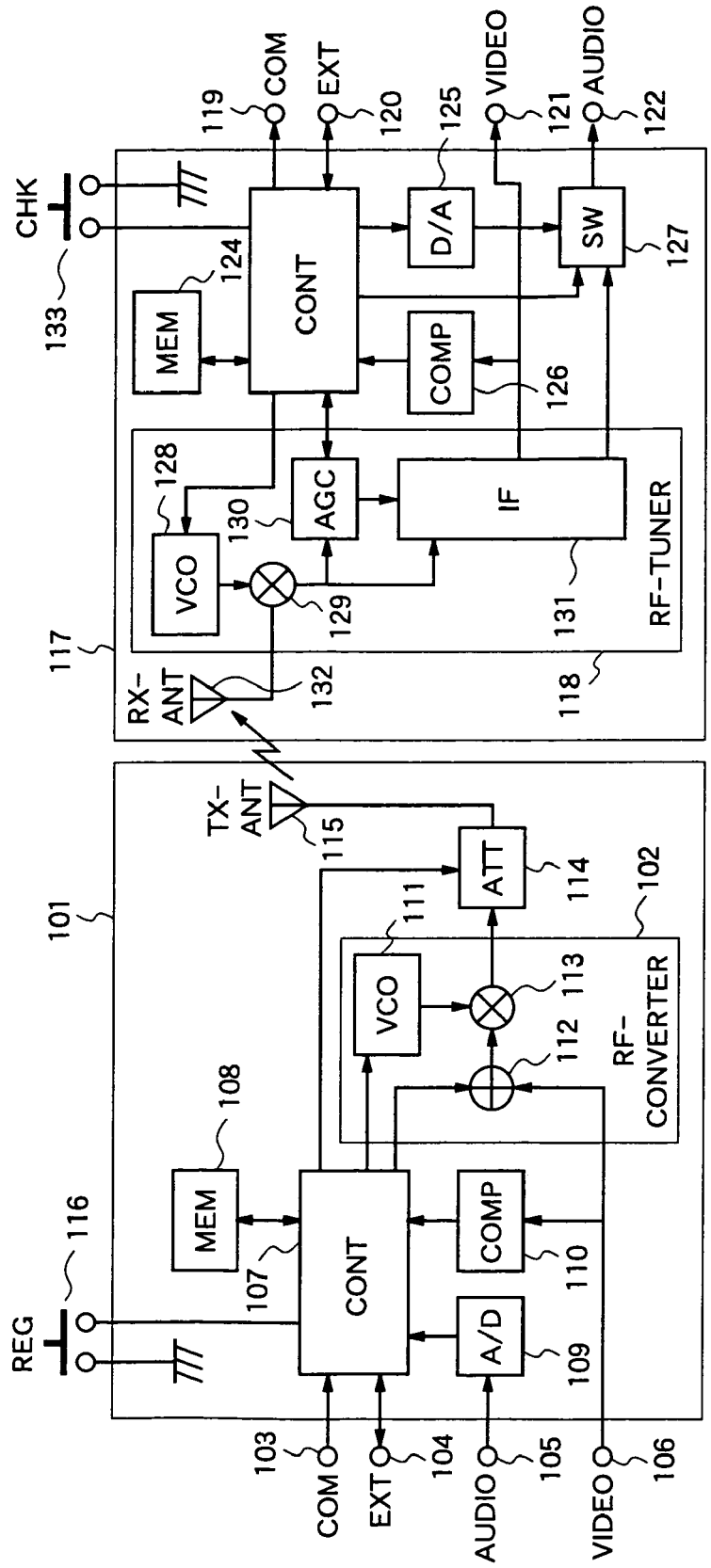
FIG. 4 is a block diagram for realizing simplex communication of a video transmission apparatus according to a second embodiment of the present invention.
Figure 6:
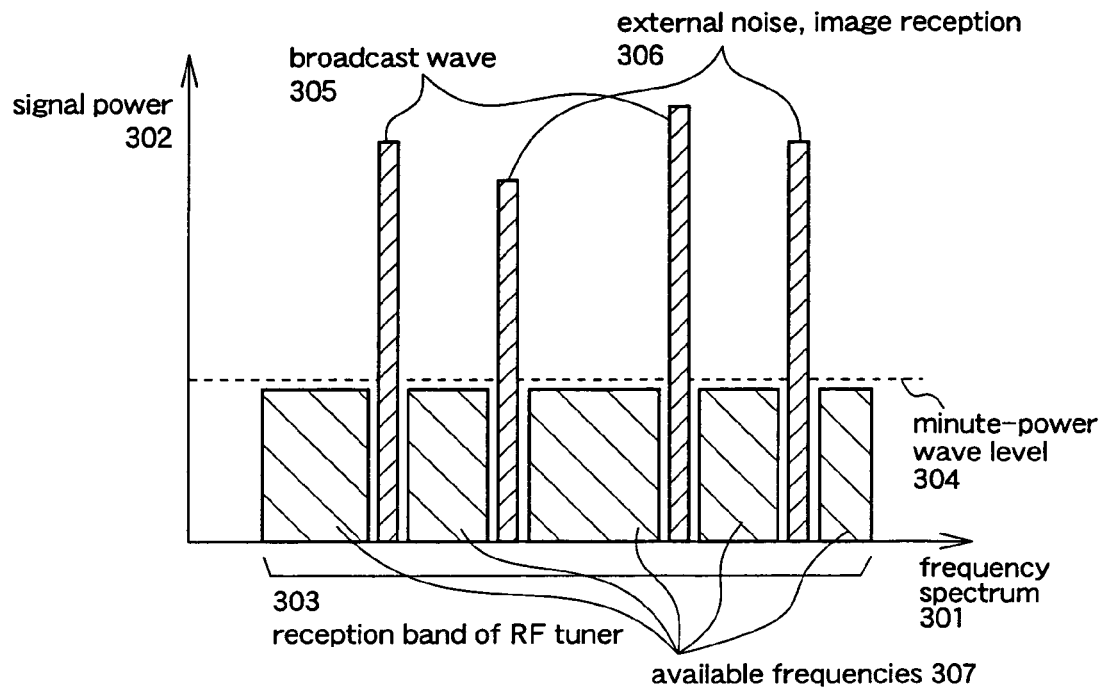
FIG. 6 is a diagram for explaining the signal power of the video transmission apparatuses according to the second, third, and fourth embodiments of the present invention.
Figure 7:
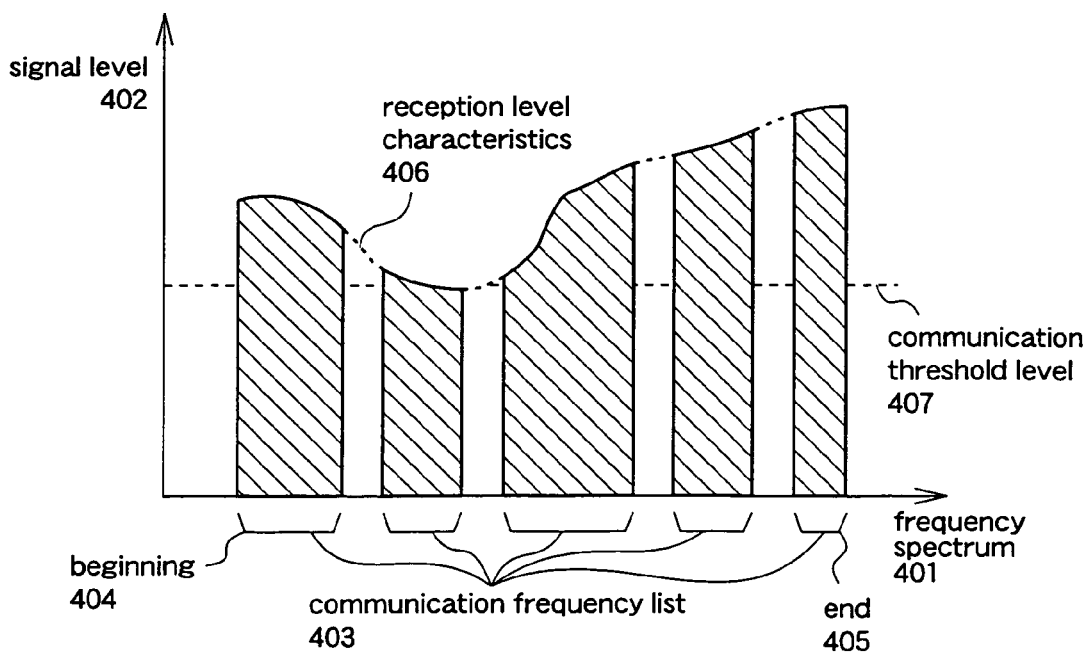
FIG. 7 is a diagram for explaining the reception level of the video transmission apparatuses according to the second, third, and fourth embodiments of the present invention.
Figure 8:
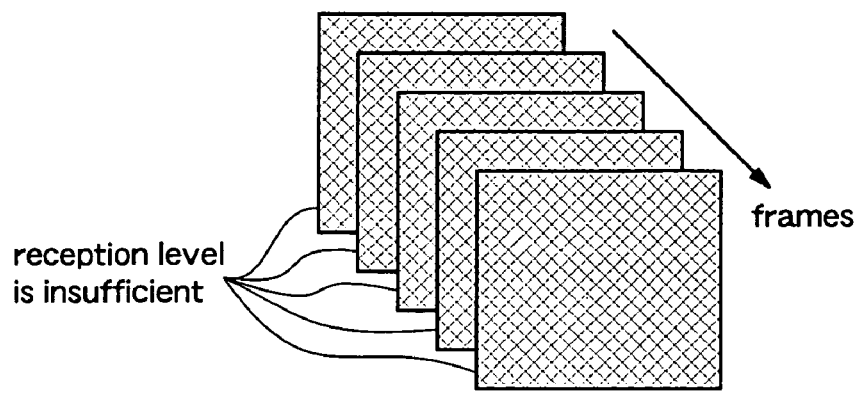
FIG. 8 is a diagram illustrating received video of the video transmission apparatuses according to the second and third embodiments of the present invention.
Figure 8:
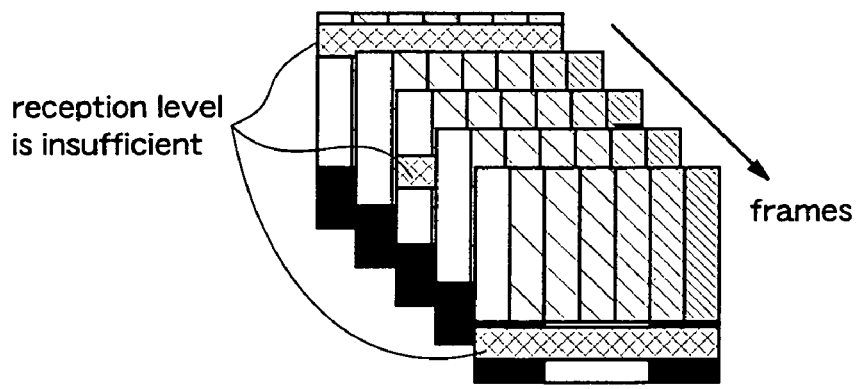
Figure 8:
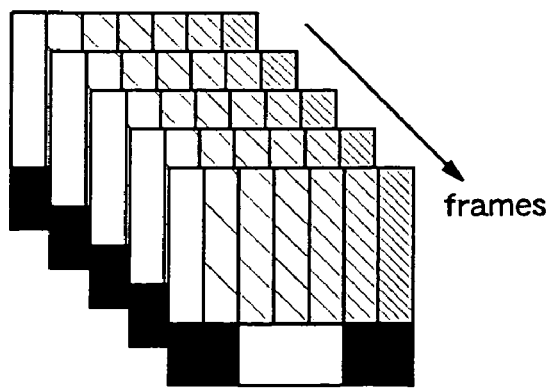
Figure 9:
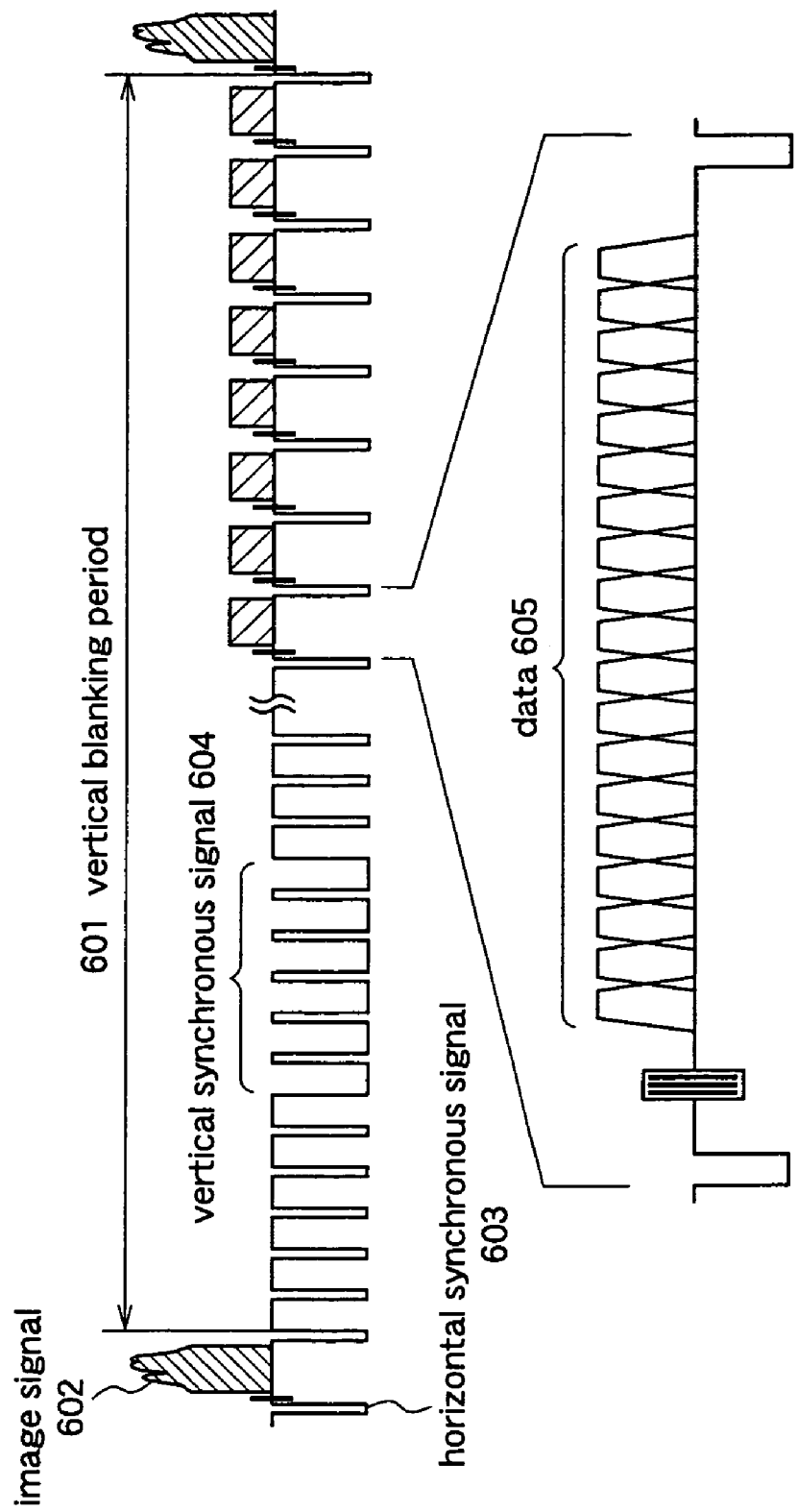
FIG. 9 is a diagram illustrating a video signal of the video transmission apparatuses according to the second and third embodiments of the present invention.

FIG. 4 illustrates the structure of a transmission apparatus according to the second embodiment of the invention. Further, FIG. 6 illustrates the signal power according to the second embodiment of the invention. Further, FIG. 7 illustrates the reception level according to the second embodiment of the invention. Further, FIG. 8 illustrates the video transmission state according to the second embodiment of the invention in comparison with that of the conventional example. Further, FIG. 9 illustrates a video signal according to the second embodiment of the invention. Further, table 1 shows the frequency changing order according to the second embodiment of the invention.

TABLE 1

| time ↓ | transmission→reception |
|---|---|
| | $f_1$ |
| | $f_2$ |
| | $f_3$ |
| | $f_4$ |
| | $f_5$ |
| | ⋮ |
| | $f_n$ |
| | $f_1$ |
| | $f_2$ |
| | ⋮ |

In FIG. 4, numeral 101 denotes a transmission apparatus performing transmission; numeral 115 denotes a transmission antenna which transmits a wave; numeral 102 denotes an RF converter which generates a standard television signal; numeral 111 denotes a voltage controlled oscillator which oscillates at a frequency according to a control voltage; numeral 112 denotes a compositor which composites two input signals by addition; numeral 113 denotes a mixer which composites two input signals by multiplication; numeral 114 denotes a variable attenuator which attenuates an input according to a control signal; numeral 103 denotes a communication terminal which receives an input from the outside; numeral 104 denotes an external apparatus connecting terminal for connecting an external apparatus; numeral 105 denotes an audio input terminal for inputting an audio signal; numeral 106 denotes a video input terminal for inputting a video signal; numeral 109 denotes an AD converter which converts an analog signal to a digital signal; numeral 110 denotes a comparator which compares an input signal with a set value; numeral 107 denotes a control circuit which controls the transmission apparatus 101; numeral 108 denotes a storage circuit which is used by the control circuit 107 to store information; and numeral 116 denotes a register button which is used for registering the setting of this transmission apparatus 101.

Further, numeral 117 denotes a receiving apparatus which performs reception; numeral 132 denotes a receiving antenna which receives a wave; numeral 118 denotes an RF tuner which receives a standard television signal; numeral 128 denotes a voltage controlled oscillator which oscillates at a frequency according to a control voltage; numeral 129 denotes a mixer which composites two input signals by multiplication; numeral 130 denotes an AGC circuit which automatically controls the gain of a signal; numeral 131 denotes an intermediate frequency processing circuit which processes an intermediate frequency signal; numeral 123 denotes a control circuit which controls the receiving apparatus 117; numeral 124 denotes a storage circuit which is used by the control circuit 123 to store information; numeral 125 denotes a DA converter which converts a digital signal to an analog signal; numeral 126 denotes a comparator which compares an input signal with a set value; numeral 127 denotes an audio selector switch which outputs one of two kinds of audio signals; numeral 133 denotes a detection button used for instructing detection as to whether a signal is transmitted to this receiving apparatus 117 or not; numeral 119 denotes a communication terminal for outputting a signal to the outside; numeral 120 denotes an external apparatus connecting terminal for connecting external apparatus; numeral 121 denotes a video output terminal for outputting a video signal; and numeral 122 denotes an audio output terminal for outputting an audio signal.

Further, numeral 500 denotes an available frequency detection means described in aspect 3. This available frequency detection means 500 detects frequencies which can be used for video transmission within the reception band of the RF tuner, in advance of use, and this means is composed of the RF tuner 118, the control circuit 123, the storage circuit 124, the comparator 126, and the detection button 133.

Further, numeral 501 denotes a frequency registration means described in aspect 3. This frequency registration means 501 registers the detected frequencies as a communication frequency list in both of the transmission and receiving apparatuses, and this means is composed of the communication terminals 103 and 119, the control circuits 107 and 123, the storage circuits 108 and 124, and the registration button 116.

Further, numeral 502 denotes a spread spectrum communication means described in aspect 3. This spread spectrum communication means 502 spreads the power spectrum by rapidly changing the frequency within the range of the communication frequency list, and this means is composed of the control circuits 107 and 123, the storage circuits 108 and 124, the RF converter 102, and the RF tuner 118.

Further, numeral 503 denotes a transmission power control means described in aspect 4. This transmission power control means 503 automatically changes the transmission power according to the use frequency band width so as to keep the power density per unit band width constant, and this means is composed of the control circuit 107, the storage circuit 108, and the variable attenuator 114.

Further, numeral 504 denotes a frequency changing means described in aspect 5. This frequency changing means 504 changes the frequency at the synchronous timing of video signal, and this means is composed of the video input terminal 106, the comparators 110 and 126, and the control circuits 107 and 123.

Further, numeral 505 denotes a control signal superposition and transmission means described in aspect 6. This control signal superposition and transmission means 505 superposes the control signal on the video signal in the blanking period and transmits the video signal, and this means is composed of the external apparatus connecting terminals 104 and 120, the control circuits 107 and 123, the comparators 110 and 126, and the compositor 112.

Further, numeral 506 denotes an audio signal superposition and transmission means described in aspect 7. This audio signal superposition and transmission means 506 subjects the audio signal to PCM, superposes the audio signal on the video signal in the blanking period, and transmits the video signal. This means is composed of the audio input terminal 105, the output terminal 122, the AD converter 109, the DA converter 125, the control circuits 107 and 123, the comparators 110 and 126, the compositor 112, and the audio changing switch 127.

Here, the frequencies which are available for video transmission are the frequency bands designated by 307 in FIG. 6. These frequencies 307 available for video transmission have no broadcast wave 305, no external noise, and no image reception of a strong broadcast wave.

Next, the operation will be described. In FIG. 4, when the operator pushes the detection button 133 of the receiving apparatus 117, the control circuit 123 starts operation. The control circuit 123 controls the RF tuner 118 so that the tuner 118 receives all of the frequencies in the reception band 303.

The video output from the RF tuner 118 is input to the comparator 126 to be compared with a predetermined detection value. The result of the comparison is input to the control circuit 123. Based on the result of the comparison, the control circuit 123 detects frequencies having no video synchronous signal due to a broadcast wave or an image wave of the broadcast wave and no random signal due to external noise, as frequencies available for video transmission, and stores these frequencies as a list in the storage circuit 124.

In the case where, in advance of use, the transmission-apparatus 101 and the receiving apparatus 117 are connected by a cable through the communication terminals 103 and 119 and then the operator pushes the registration button 116 of the transmission apparatus 101, the control circuit 107 of the transmission apparatus 101 requests the control circuit 123 of the receiving apparatus 117 to send the list of the frequencies available for video transmission, through the communication terminal 103.

The control circuit 123 of the receiving apparatus 117 reads the list of the frequencies available for video transmission which are stored in the storage circuit 124, and stores it again in this storage circuit 124 as a communication frequency list, and then transmits it to the transmission apparatus 101 through the communication terminals 119 and 103.

In the transmission apparatus 101, the list of the frequencies available for video transmission which have been transmitted from the receiving apparatus 117 is stored in the storage circuit 108 as a communication frequency list.

Turning to FIG. 4, when a video transmission request signal from an external apparatus is input to the external apparatus control terminal 104 of the transmission apparatus 101 and further a video signal from an external apparatus is input to the video input terminal 106, the control circuit 107 of the transmission apparatus 101 reads the communication frequency list which is stored in the storage circuit 108. In parallel with this, the control circuit 107 sets the attenuation of the variable attenuator 114 to the maximum and, thereafter, operates the RF converter 102.

Further, the control circuit 107 spreads the power spectrum by rapidly changing the RF frequency of the RF converter 102, within the range of the communication frequency list which has been read, in accordance with the frequency changing order shown in table 1 and, thereafter, reduces the attenuation of the variable attenuator 114 to start transmission.

The frequency changing order shown in table 1 is an example which is predetermined between the transmission apparatus 101 and the receiving apparatus 117.

Further, the communication frequency is changed according to the timing of the horizontal synchronous signal or vertical synchronous signal of the video signal input through the video input terminal 106. At this time, the synchronous signal to be used is extracted from the video signal by the comparator 110.

In order to prevent influences on other radio apparatuses and utilize the wave effectively, it is necessary to set the RF power density per unit band width, which is transmitted from the transmission apparatus 101, to a level lower than the minute-power wave level 304 shown in FIG. 6. Therefore, the control circuit 107 obtains the band width of the use frequency and the diffusion coefficient of the power spectrum from the communication frequency list, and thereby controls the attenuation of the variable attenuator 114 so that the RF power density per unit band width is kept constant.

On the other hand, in FIG. 4, when a video reception request signal from an external apparatus is input to the external apparatus control terminal 120 of the receiving apparatus 117, the control circuit 123 of the receiving apparatus 117 reads the communication frequency list stored in the storage circuit 124 and operates the RF tuner 118.

Thereby, the control circuit 123 rapidly changes the receiving frequency of the RF tuner 118, and receives the RF signal from the transmission apparatus 101. The frequency change is performed in the frequency changing order shown in table 1, within the communication frequency list read by the control circuit 123. Further, as the frequency change timing, the pseudo synchronous timing generated inside the control circuit 123 is used.

During the period immediately after the receiving apparatus 117 has started reception, the synchronous timing of the video signal at the transmitting end and the pseudo synchronous timing at the receiving end do not necessarily coincide with each other. Further, the transmission frequency and the receiving frequency do not necessarily temporally coincide with each other. Therefore, no signal appears in the video output of the RF tuner of the receiving apparatus 117 nor in the output of the comparator 126.

Accordingly, the control circuit 123 of the receiving apparatus 117 tries to detect the transmission signal, by successively changing the pseudo synchronous timing and the start time of the time table of the reception frequency, while monitoring the output of the comparator 12.

Since the synchronous timing of the video signal at the transmitting end and the time assignment period of the transmission frequency are constant, the receiving end succeeds in detecting the transmission signal after predetermined trials.

When detection of the transmission signal has succeeded, the control circuit 123 of the receiving apparatus 117 changes the synchronous timing of the received video signal extracted by the comparator 126 to the pseudo synchronous timing.

Generally, the reception level of radio transmission using a wide band is affected by the multi-path and the frequency characteristics of the transmission/receiving antenna. When being affected by the frequency characteristics of the multi-path and the transmission/receiving antenna, the reception level changes significantly as shown by 406 in FIG. 7. At a frequency the reception level of which is lower than the communication threshold level 407, the video signal cannot be reproduced. Therefore, in the conventional method using a single frequency, when the position of the transmission apparatus or the receiving apparatus changes during it is used or when the position of a peripheral reflecting object which reflects the wave changes, there occurs a condition where no wave can be received as shown in FIG. 8(a), whereby the usability is significantly degraded.

In contrast with this, according to the second embodiment of the invention, since only a portion of the video signal cannot be reproduced as shown in FIG. 8(b), the reception status is improved.

Generally, in order to prevent influences on other radio apparatuses and effectively use the wave, in a radio transmission apparatus using a minute-power wave, an upper limit is set for the electric field strength in a position apart from the apparatus by a predetermined distance. The upper limit depends on the degree of influence on another radio apparatus which uses the same frequency band, but the inspection and measurement method is decided on the basis of the system of the radio apparatus which will be influenced. Control of the electric field strength in a position apart by a predetermined distance is realized by controlling the transmission power in the case of using a transmission antenna which is fixed on the apparatus.

Further, although the mutual influence between the radio apparatuses of the system using a single frequency and the mutual influence between the radio apparatuses of the system using a spread spectrum are great, the mutual influence between these systems is small. This is applicable to the mutual influence between the transmission apparatus of the present invention which uses the frequency band of the standard television broadcasting and spreads the spectrum for transmission, and existing another radio apparatus, that is, a television receiver which uses a single frequency.

For the reasons described above, according to the transmission apparatus of this embodiment which uses the frequency band of the standard television broadcasting and spreads the spectrum for transmission, it is possible to realize transmission at a higher output power than that of the conventional system using a single frequency. Since the reception power increases with the output power, the transmission distance can be increased.

Further, in the transmission apparatus according to this second embodiment, the frequencies available for video transmission are detected and registered in advance of use. Therefore, in the future, even when digital television broadcasting or mobile communication equipment will use the same frequency band, the transmission apparatus of this embodiment can coexist with these systems.

In the state where the video signal is transmitted from the transmission apparatus 101, when a control signal for controlling the external apparatus which is connected to the receiving apparatus 117 is input to the external apparatus connecting terminal 104 of the transmission apparatus 101, the control circuit 107 of the transmission apparatus 101 outputs the received control signal to the RF converter 102 at the timing of superposing it on the video signal in the blanking period.

The control signal is superposed on the part of data 605 shown in FIG. 9 by the compositor 112 in the RF converter 102, and then transmitted to the receiving apparatus 117.

In the receiving apparatus 117 which has received the video signal in which the control signal is superposed, the comparator 126 extracts the control signal from the video signal and outputs it to the external apparatus connecting terminal 120.

Thereby, the external apparatus connected to the receiving apparatus 117 can be controlled by the external apparatus connected to the transmission apparatus 101, resulting in a high performance video transmission apparatus.

Further, in the state where the video signal is transmitted from the transmission apparatus 101, when an audio signal is input to the audio input terminal 105, the audio signal is AD converted by the AD converter 109 and then input to the control circuit 107. When the AD-converted audio signal is input, the control circuit 107 subjects the received audio signal to PCM, and outputs the PCM signal to the RF converter 102 at the timing of superposing it on the video signal in the blanking period shown in FIG. 9.

The PCM signal is superposed on the part of data 605 shown in FIG. 9 by the compositor 112 in the RF converter 102 to be transmitted to the receiving apparatus 117.

In the receiving apparatus 117 which has received the video signal on which the PCM signal is superposed, the PCM signal is extracted from the video signal by the comparator 126 and output to the control circuit 123. The control circuit 123 outputs the PCM signal to the DA converter 125, and switches the audio switch circuit 127 to the PCM audio use state.

In the DA converter 125, the PCM signal is converted to an audio signal to be output to the audio output terminal 122.

Thereby, high-definition audio transmission having no audio noise due to communication frequency change is realized.

As described above, in the transmission apparatus according to the second embodiment, in advance of use, the frequencies which are available for video transmission are detected within the reception band of the RF tuner of the receiving apparatus. The detected frequencies are registered, as a communication frequency list, in both of the transmission apparatus and the receiving apparatus, and the frequency is rapidly changed within the range of the communication frequency list to spread the power spectrum for communication. Therefore, inexpensive and simplex, i.e., one-direction, video transmission also having a function of receiving television broadcasting, can be realized. Further, the influence of the multi-path can be reduced, and it is not influenced by a strong existing broadcast wave. Moreover, a communication distance longer than that of the system using a single frequency is achieved and, therefore, it is possible to realize a video transmission apparatus which can coexist with digital television broadcasting or mobile communication equipment which will use the same frequency band in the future.

Further, since the transmission power is automatically changed according to the use frequency band width so as to keep the power density per unit band width constant, it is possible to realize a video transmission apparatus which operates at a minute-power level which does not interfere with reception of the existing radio receiving apparatus even when the use frequency band width changes.

Further, since the frequency is changed at the synchronous timing of the video signal, disturbance of the video signal due to the frequency change is reduced, resulting in a video transmission apparatus with improved image quality.

Furthermore, since the control signal is superposed on the video signal in the blanking period to be transmitted, it is possible to realize a high performance video transmission apparatus which can control the operation of the receiving apparatus from the transmission apparatus.

Moreover, since the audio signal is subjected to PCM and the PCM audio signal is superposed on the video signal in the blanking period to be transmitted, noise in the audio signal due to frequency change is removed, resulting in a video transmission apparatus of improved sound quality.

Accordingly, the transmission apparatus of this second embodiment has the function of receiving the NTSC system standard television broadcasting, reduces the influence of multi-path, enables high-definition audio transmission and highly efficient performance, and realizes a longer communication distance than that in the case of using a single frequency. Further, in the future, even when digital television broadcasting or mobile communication equipment will use the same frequency band, the transmission apparatus can coexist with them and, furthermore, the transmission apparatus can be applied to a VTR movie apparatus or the like in which a camera is wireless-detachable from a recording unit body.

Further, while in this second embodiment the digitized audio signal is subjected to PCM, other compressive coding methods may be employed.

Further, while in this second embodiment the NTSC system is employed as a standard television signal, the PAS system or the SECAM system may be employed.

Embodiment 3

In this third embodiment, two pieces of transmission/reception apparatuses, each having a transmission apparatus and a receiving apparatus according to the second embodiment, are provided.

Hereinafter, the third embodiment of the present invention will be described by using FIGS. 5, 6, 7, 8 and 8, and table 2.

This third embodiment corresponds to the inventions described in aspects 8 and 9 and aspects 20 and 21 of this application.

Figure 5:
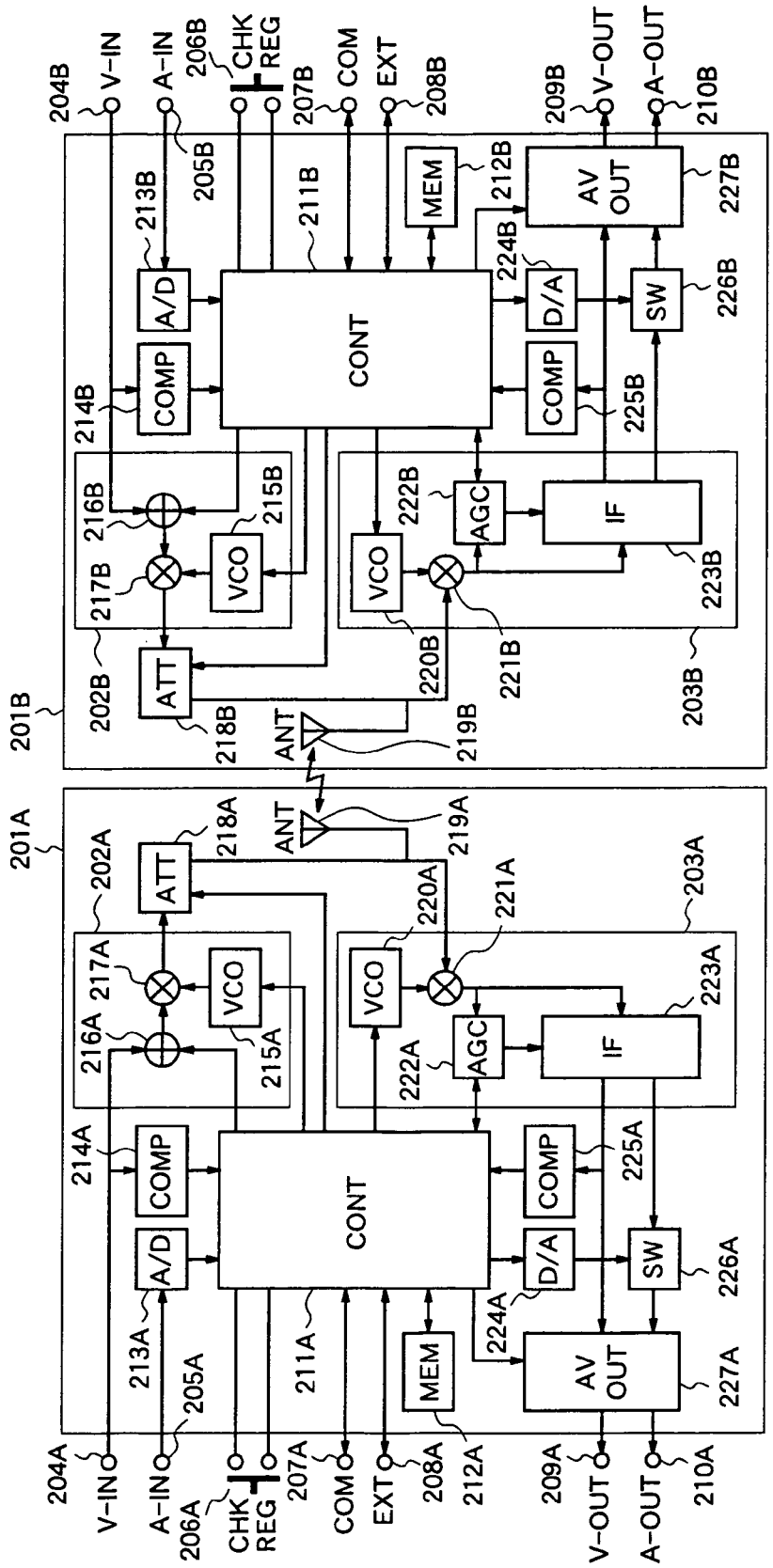
FIG. 5 is a block diagram for realizing duplex communication of video transmission apparatuses according to third and fourth embodiments of the present invention.

FIG. 5 shows the structure of a transmission apparatus according to the third embodiment of the invention. FIG. 6 shows the signal power according to the third embodiment of the invention. FIG. 7 shows the reception level according to the third embodiment of the invention. FIG. 8 shows the transmission status according to the third embodiment of the invention in comparison with that of the conventional example. FIG. 9 shows an image signal according to the third embodiment of the invention. Table 2 shows the frequency changing order and the frequency time table according to the third embodiment of the invention.

TABLE 2

| | first→second | second→first |
|---|---|---|
| time | $f_1$ | $f_{n-1}$ |
| | $f_2$ | $f_n$ |
| | $f_3$ | $f_1$ |
| | $f_4$ | $f_2$ |
| | $f_5$ | $f_3$ |
| | ⋮ | ⋮ |
| | $f_n$ | $f_{n-2}$ |
| | $f_1$ | $f_{n-1}$ |
| | $f_2$ | $f_n$ |
| | ⋮ | ⋮ |

In FIG. 5, 201A and 201B denote transmission/reception apparatuses each performing transmission and reception; 202A and 202B denote RF converters each generating a standard television signal; 215A and 215B denote voltage-controlled oscillators each oscillating at a frequency according to a control voltage; 216A and 216B denote compositors each compositing two input signals by addition; 217A and 217B denote mixers each compositing two input signals by multiplication; 218A and 218B denote variable attenuators each compositing input signals according to a control signal; 219A and 219B denote transmission/reception antennae each transmitting and receiving a wave; 207A and 207B denote communication terminals each receiving an input signal from the outside and outputting it to the outside; 208A and 208B denote external apparatus connecting terminals each connecting the transmission/reception apparatus with an external apparatus; 205A and 205B denote audio input terminals each receiving an audio signal; 204A and 204B denote video input terminals each receiving a video signal; 213A and 213B denote AD converters each converting an analog signal to a digital signal; 214A and 214B denote comparators each comparing an input signal with a set value; 211A and 211B denote control circuits for controlling the transmission/reception apparatuses 201A and 201B, respectively; 212A and 212B denote storage circuits used by the control circuits 211A and 211B to store information, respectively; 206A and 206B denote detection/registration buttons for registering settings of the transmission/reception apparatuses 201A and 201B and for instructing detection as to whether a signal is transmitted to the transmission/reception apparatuses 201A and 201B or not, respectively; 203A and 203B denote RF tuners each receiving a standard television signal; 220A and 220B denote voltage controlled oscillators each oscillating at a frequency according to a control signal; 221A and 221B denote mixers each compositing two inputs by multiplication; 222A and 222B denote AGC circuits each controlling the gain of the signal; 223A and 223B denote intermediate-frequency processing circuits each processing an intermediate-frequency signal; numeral 224A and 224B denote DA converters each converting a digital signal to an analog signal; 225A and 225B denote comparators each comparing an input signal with a set value; 226A and 226B denotes audio selector switches each outputting one of two kinds of audio signals; 209A and 209B denote video output terminals each outputting a video signal; and 210A and 210B denote audio output terminals each outputting an audio signal.

In FIG. 5, 201A and 201B denote a first transmission/reception apparatus and a second transmission/reception apparatus which are described in aspect 8, respectively.

Further, 510 denotes a frequency changing order control means described in aspect 8. This frequency changing order control means 510 controls the frequency changing order so that the frequency is changed in one direction from the higher frequency to the lower frequency or from the lower frequency to the higher frequency, within the range of the communication frequency list and, when reaching the end of the frequency list, the frequency is returned to the beginning of the frequency list. This means 510 is composed of the control circuit 211A and the storage circuit 212A.

Further, 511 denotes a communication control means described in aspect 8. This communication control means 511 controls communication so that duplex, i.e., bidirectional, communication is carried out, by using a frequency time table in which the first and second transmission/reception apparatuses always use different frequencies. This means 511 is composed of the control circuit 211A and the storage circuit 212A.

Further, 512 denotes a communication frequency list update means described in aspect 9. This communication frequency list update means 512 uses the registered communication frequency list when starting communication and, after the communication has once started, it uses a second communication frequency list which is obtained by duplicating the communication frequency list. The second communication frequency list is used for exchanging information about the result of communication, i.e., good or bad, between the two pieces of transmission/reception apparatuses. This means 512 is composed of the control circuit 211A, the storage circuit 212A, the comparators 214A and 225A, and the compositor 216A.

Each of the first and second transmission/reception apparatuses 201A and 201B is provided with the units and means constituting the transmission apparatus and the receiving apparatus shown in FIG. 5.

Next, the operation will be described.

In FIG. 5, when the operator pushes the detection/registration button 206A of the first transmission/reception apparatus 201A, the control circuit 211A starts the operation. Thereby, the control circuit 211A controls the RF tuner 203A so that it receives all of the frequencies within the reception band 303 shown in FIG. 3.

The video output from the RF tuner 203A is input to the comparator 225A. The result of comparison is input to the control circuit 211A, and the control circuit 211A detects frequencies having no video synchronous signal due to a broadcast wave or an image wave of the broadcast wave and no random signal due to external noise, as frequencies available for video transmission. These frequencies are stored as a list in the storage circuit 212A.

The second transmission/reception apparatus 201B is identical in structure to the first transmission/reception apparatus 201A, and it performs the series of operations after the detection/registration button 206B is pushed, like the above-described first transmission/reception apparatus 201A.

The first and second transmission/reception apparatuses are not necessarily used in the same position or direction. Therefore, usually the directions of the antennae 219A and 219B are different from the broadcast wave arrival direction and, therefore, their lists detected and stored as frequencies available for video transmission are different from each other.

Next, after the first transmission/reception apparatus 201A and the second transmission/reception apparatus 201B are connected by a cable through the communication terminals 207A and 207B, when one of the detection/registration buttons 206A and 206B is pushed, the control circuit of one of the transmission/reception apparatuses requests the control circuit of the other transmission/reception apparatus to send the list of frequencies available for video transmission, through the communication terminals.

Hereinafter, the operation will be described on the assumption that the detection/registration button 206A of the first transmission/reception apparatus 201A was pushed.

The control circuit 211B of the second transmission/reception apparatus 201B reads the list of frequencies available for video transmission which is stored in the storage circuit 212B. Then, it sends this list to the first transmission/reception apparatus 201A through the communication terminal 207B.

In the first transmission/reception apparatus 201A, the list of frequencies available for video transmission which is stored in the storage circuit 212A is read out, and this list is multiplied by the list of frequencies available for video transmission which has been transmitted from the second transmission/reception apparatus 201B, and the product is stored in the storage circuit 212A as a communication frequency list and also transmitted to the communication terminal 207A.

In the second transmission/reception apparatus 201B, the communication frequency list transmitted from the first transmission/reception apparatus 201A is stored in the storage circuit 212B.

Next, in FIG. 5, it is assumed that a video transmission request signal from an external apparatus is input to the external apparatus control terminal 208A of the first transmission/reception apparatus 201A while a video signal from an external apparatus is input to the video input terminal 204A. At this time, the control circuit 211A reads the communication frequency list which is stored in the storage circuit 212A. Simultaneously, the control circuit 211A sets the attenuation of the variable attenuator 218A at the maximum and, thereafter, operates the RF converter 202A.

Further, the control circuit 211A rapidly changes the RF frequency of the RF converter 202A, within the range of the read communication frequency list, according to the frequency changing order such that the frequency changes in one direction, i.e., from the higher frequency to the lower frequency or from the lower frequency to the higher frequency as shown by the first column (the left column) of table 2 and, further, when reaching the end of the communication frequency list, the frequency is returned to the beginning of the list. After the power spectrum is spread by changing the frequency in this way, the control circuit 211A reduces the attenuation of the variable attenuator 218A to start transmission.

The frequency changing order shown in table 2 is predetermined between the first transmission/reception apparatus 201A and the second transmission/reception apparatus 201B.

Further, the communication frequency is changed according to the timing of the horizontal synchronous signal or the vertical synchronous signal of the video signal input through the video input terminal 204A. Further, the synchronous signal to be used is extracted from the video signal by the comparator 214A.

In order to prevent influences on other radio apparatuses and utilize the wave effectively, it is necessary to set the RF power density per unit band width at a level lower than the minute-power level 304 shown in FIG. 6. Therefore, the control circuit 211A obtains the band width of the use frequency and diffusion coefficient of the power spectrum from the communication frequency list, and thereby controls the attenuation of the variable attenuator 218A so as to keep the RF power density per unit band width constant.

On the other hand, in FIG. 5, when a video reception request signal from an external apparatus is input to the external apparatus control terminal 208B of the second transmission/reception apparatus 201B, the control circuit 208B of the second transmission/reception apparatus reads the communication frequency list which is stored in the storage circuit 212B, and operates the RF tuner 203B.

Further, the control circuit 211B of the second transmission/reception apparatus 201B rapidly changes the reception frequency of the RF tuner 203B within the read communication frequency list, according to the frequency changing order shown in the first column of table 2, by using, as the frequency switching timing, the pseudo synchronous timing generated in the control circuit 211B, thereby receiving the RF signal from the first transmission/reception apparatus 201A.

In the period immediately after the second transmission/reception apparatus 201B has started reception, the synchronous timing of the video signal at the transmitting end and the pseudo synchronous timing at the receiving end do not necessarily coincide with each other. Further, the transmission frequency and the receiving frequency do not necessarily temporally coincide with each other. Therefore, no signal appears in the video output of the RF tuner 203B of the second transmission/reception apparatus nor in the output of the comparator 225B.

Accordingly, the control circuit 211B of the second transmission/reception apparatus 201B tries to detect the transmission signal from the first transmission/reception apparatus 201A by successively changing the pseudo synchronous timing and the start time of the time table of the reception frequency, while monitoring the output of the comparator 225B.

Since the synchronous timing of the video signal from the first transmission/reception apparatus 201A and the time cycle of the time table of the transmission frequency are constant, the second transmission/reception apparatus 201B succeeds in detecting the transmission signal from the first transmission/reception apparatus 201A after predetermined trials.

When detection of the transmission signal from the first transmission/reception apparatus 201A has succeeded, the control circuit 211B of the second transmission/reception apparatus 201B changes the synchronous timing of the received video signal extracted by the comparator 126 to the pseudo synchronous timing.

Further, in the second transmission/reception apparatus 201B, when detection of the transmission signal from the first transmission/reception apparatus 201A has been completed, the control circuit 211B reads the communication frequency list stored in the storage circuit 212B, and sets the attenuation of the variable attenuator 218B to the maximum and, thereafter, operates the RF converter 202B.

Further, the control circuit 211B rapidly changes the RF frequency of the RF converter within the range of the read communication frequency list, according to the frequency changing order such that the frequency is changed in one direction, i.e., from the higher frequency to the lower frequency or from the lower frequency to the higher frequency as shown in the second column of table 2 and, further, when reaching the end of the communication frequency list, the frequency is returned to the beginning of the list. Furthermore, the frequency change is carried out by using the frequency time table using frequencies which are always different from the transmission frequency of the first transmission/reception apparatus and are not the image frequency of the reception frequency. After spreading the power spectrum by the frequency change, the control circuit 211B reduces the attenuation of the variable attenuator 218B to start transmission.

The frequency changing order shown in table 2 is predetermined between the first transmission/reception apparatus 201A and the second transmission/reception apparatus 201B.

Further, the communication frequency is changed according to the synchronous timing of the video signal transmitted from the first transmission/reception apparatus 201A which has completed the detection.

In order to prevent influences on other radio apparatuses and effectively utilize the wave, it is necessary to set the RF power density per unit band width for transmission to a level lower than the minute-power level 304 shown in FIG. 3. Therefore, the control circuit 211B obtains the band width of the use frequency and the diffusion coefficient of the power spectrum from the communication frequency list, and thereby controls the attenuation of the variable attenuator 218B so as to keep the RF power density per unit band width constant.

On the other hand, in the first transmission/reception apparatus 201A, the RF tuner 203A is operated when a predetermined period of time has passed after starting the transmission.

Further, the control circuit 211A of the first transmission/reception apparatus 201A rapidly changes the reception frequency of the RF tuner 203A within the range of the communication frequency list, according to the frequency changing order shown in the second column of table 2, by using, as the frequency changing timing, the synchronous timing of the video signal being transmitted, thereby receiving the RF signal from the second transmission/reception apparatus 201B.

In the period immediately after the first transmission/reception apparatus 201A has started reception, the transmission frequency and the reception frequency do not necessarily temporally coincide with each other. Therefore, no signal appears in the video output of the RF tuner 203A of the first transmission/reception apparatus nor in the output of the comparator 225A.

Accordingly, the control circuit 211A of the first transmission/reception apparatus 201A tries to detect the transmission signal from the second transmission/reception apparatus 201B by successively changing the start time of the time table of the reception frequency, while monitoring the output of the comparator 225A.

Since the time table cycle of the transmission frequency of the second transmission/reception frequency is constant, the first transmission/reception apparatus succeeds in detecting the transmission signal from the second transmission/reception apparatus after predetermined trials.

In this way, duplex communication between the first and second transmission/reception apparatuses is realized.

Generally, the reception level of radio communication using a wide frequency band is affected by the multi-path and the frequency response of the transmission/reception antenna, and thereby varies significantly like the reception level 406 shown in FIG. 7. At a frequency the reception level of which is lower than the communication threshold level 407, no video signal can be reproduced.

When duplex communication between the first and second transmission/reception apparatuses is realized as described above, these apparatuses can exchange information about the frequency the reception level of which is lower than the communication threshold level due to the influences of the multi-path and the frequency response of the transmission/reception antenna.

In the second transmission/reception apparatus 201B, a pseudo video signal is generated by the control circuit 211B, and the information about the frequency lower than the communication a threshold level is superposed on the data 605 of the video signal in the vertical blanking period by using the compositor 216 to be returned to the first transmission/reception apparatus 201A. Further, in the second transmission/reception apparatus 201B, a second communication frequency list is formed by duplicating the communication frequency list, and the frequencies lower than the communication threshold level are removed from the second communication frequency list, and then the second communication frequency list is stored in the storage circuit 212B.

In the first transmission/reception apparatus 201A, the information about the frequencies lower than the communication threshold level, which has been returned, is confirmed, and a second communication frequency list is formed by duplicating the communication frequency list. Then, the frequencies lower than the communication threshold level, which have been returned, are removed from the second list, and the second list is stored in the storage circuit 212A and, simultaneously, transmission using this second communication frequency list is started.

In the second transmission/reception apparatus 201B, since the communication frequency list has been changed, the transmission signal from the first transmission/reception apparatus which has been detected is lost. However, after a predetermined period of time, it resumes detection of the transmission signal from the first transmission/reception apparatus and the above-described series of responding operations by using the second communication frequency list which has been formed.

Also in the first transmission/reception apparatus, since the communication frequency list has been changed, the transmission signal from the second transmission/reception apparatus which has been detected is lost. However, after a predetermined period of time, it resumes detection of the transmission signal from the second transmission/reception apparatus by using the second communication frequency list which has been formed, whereby duplex communication is reestablished.

Further, when the frequencies lower than the communication threshold level are changed because the position of the first or second transmission/reception apparatus is changed during it is used or the status of the multi-path is changed, the first transmission/reception apparatus 201A which detects it changes the communication frequency list to be used from the second communication frequency list to the original communication frequency list, and starts transmission.

In the second transmission/reception apparatus, since the communication frequency list has been changed, the transmission signal from the first transmission/reception apparatus which has been detected is lost. However, after a predetermined period of time, the second transmission/reception apparatus changes the communication frequency list to be used from the second communication frequency list to the original communication frequency list, and resumes detection of the transmission signal from the first transmission/reception apparatus and the above-described series of responding operations. Furthermore, with respect to transmission from the self-apparatus, the second transmission/reception apparatus changes the communication frequency list to be used from the second communication frequency list to the original communication frequency list, and starts transmission.

Further, in the first transmission/reception apparatus 201A, since the communication frequency list has been changed, the transmission signal from the second transmission/reception apparatus which has been detected is lost. However, after a predetermined period of time, the first transmission/reception apparatus 201A changes the communication frequency list to be used from the second communication frequency list to the original communication frequency list, and resumes detection of the transmission signal from the second transmission/reception apparatus, whereby duplex communication is reestablished.

After the duplex communication using the original communication frequency list has been reestablished since the communication returns into the initial status, the first and second transmission/reception apparatuses newly exchange the information about frequencies lower than the communication threshold level in accordance with the above-described series of processes and operations, and reestablish duplex communication using the second communication frequency list which is updated by using the information.

In the operation of forming and updating the second communication frequency list to be used, as described above, both the first and second transmission/reception apparatuses automatically control the RF power density per unit band width in accordance with the use frequency band width and the diffusion coefficient of the power spectrum.

As described above, in simplex communication, because of the influences of the multi-path and the frequency characteristics of the transmission/reception antenna, a portion of the video signal cannot be reproduced as shown in FIG. 8(*b*), resulting in degraded usability. However, since duplex communication is realized, communication can be performed without using frequencies lower than the communication threshold level, thereby realizing video transmission without being affected by the multi-path and the frequency characteristics of the transmission/reception antenna as shown in FIG. 8(*c*).

Further, as described for the first embodiment, generally, in order to prevent influences on other radio apparatuses and effectively utilize the wave, in a radio transmission apparatus using a minute-power wave, an upper limit is set for the electric field strength in a position apart from the apparatus by a predetermined distance. The upper limit is decided according to the degree of influence on another radio apparatus which uses the same frequency band, and the inspection and measurement method is decided on the basis of the system of the radio apparatus which will be influenced. Control of the electric field strength in a position apart by a predetermined distance is realized by controlling the transmission power in the case of using a transmission antenna which is fixed on the apparatus.

Further, although the mutual influence between the radio apparatuses of the system using a single frequency and the mutual influence between the radio apparatuses of the system using a spread spectrum are great, the mutual influence between these systems is small. The transmission apparatus of this third embodiment uses the frequency band of the standard television broadcasting, and the existing other radio apparatus is a television receiver which uses a single frequency.

For the reasons described above, according to the transmission apparatus of this embodiment which uses the frequency band of the standard television broadcasting and spreads the spectrum for transmission, it is possible to realize transmission with a higher output power than that of the conventional system using a single frequency. Further, since the received power increases with the output power, the transmission distance is increased.

Further, in the transmission apparatus of this third embodiment, the frequencies available for video transmission are detected and registered in advance of use. Therefore, in the future, even when digital television broadcasting or mobile communication equipment will use the same frequency band, the video transmission apparatus of this third embodiment can coexist with them.

Further, since PCM transmission of an audio signal is also possible as in the first embodiment, high-definition bidirectional audio transmission is realized.

Further, as in the second embodiment, since the control signal from the external apparatus which is connected to the first and second transmission/reception apparatuses can be superposed on the part of data 605 shown in FIG. 6 to be transmitted bidirectionally, a higher performance video transmission apparatus is realized.

As described above, in the transmission apparatus according to the third embodiment, each of the first and second transmission/reception apparatuses each having the transmission apparatus and the receiving apparatus according to the second embodiment, performs duplex communication according to the frequency changing order such that the frequency is changed in one direction, i.e., from the higher frequency to the lower frequency or from the lower frequency to the higher frequency, within the range of the communication frequency list and, when reaching the end of the frequency list, the frequency returns to the beginning of the frequency list, and by using the frequency time table in which the first and second transmission/reception apparatuses always use different frequencies. Therefore, it is possible to realize a high-performance and inexpensive duplex video transmission apparatus which has the television broadcast receiving function, and realizes mutual control between the respective transmission/reception apparatuses.

Further, the communication frequency list which is registered is used when starting communication and, after communication has started, the second communication frequency list obtained by duplicating the registered communication frequency list is used, and the second communication frequency list is appropriately updated by exchanging information about the result of communication, i.e., good or bad, between the above-mentioned two transmission/reception apparatuses, thereby resulting in a video transmission apparatus which solves the influence of the multi-path.

Accordingly, duplex video transmission is realized, and the influence of the multi-path can be solved, and this third embodiment can be applied to a remote-controlled monitor camera for guarding, and the like.

Further, while in this third embodiment the digitized audio signal is subjected to PCM, other compressive coding methods may be employed.

Further, while in this third embodiment the NTSC system is employed as a standard television signal, the PAS system or the SECAM system may be employed.

Embodiment 4

In this fourth embodiment, interception of a minute-power wave is prevented in such a situation that a plurality of transmission apparatuses are used in a multiple dwelling house.

Hereinafter, the fourth embodiment of the present invention will be described by using FIGS. 5, 6, and 7, and table 3.

This fourth embodiment corresponds to the inventions described in aspects 10 to 12 and aspects 22 to 24 of this application.

FIG. 5 shows the structure of a transmission apparatus according to the fourth embodiment of the invention. FIG. 6 shows a video signal according to the fourth embodiment of the invention. FIG. 7 shows the use status in a multiple dwelling house where the areas of use waves overlap uncertainly, according to the fourth embodiment of the invention. Table 3 shows the frequency changing order and the frequency time table, according to the fourth embodiment of the invention.

TABLE 3

| | C→D | D→C | E→F | F→E | A→B | B→A |
|---|---|---|---|---|---|---|
| | $f_1$ | $f_{n-1}$ | $f_n$ | $f_{n-2}$ | $f_{n-3}$ | $f_{n-4}$ |
| | $f_2$ | $f_n$ | $f_1$ | $f_{n-1}$ | $f_{n-2}$ | $f_{n-3}$ |
| | $f_3$ | $f_1$ | $f_2$ | $f_n$ | $f_{n-1}$ | $f_{n-2}$ |
| | $f_4$ | $f_2$ | $f_3$ | $f_1$ | $f_n$ | $f_{n-1}$ |
| time | $f_5$ | $f_3$ | $f_4$ | $f_2$ | $f_1$ | $f_n$ |
| | ⋮ | ⋮ | ⋮ | ⋮ | ⋮ | ⋮ |
| | $f_n$ | $f_{n-2}$ | $f_{n-1}$ | $f_{n-3}$ | $f_{n-4}$ | $f_{n-5}$ |
| | $f_1$ | $f_{n-1}$ | $f_n$ | $f_{n-2}$ | $f_{n-3}$ | $f_{n-4}$ |
| | $f_2$ | $f_n$ | $f_1$ | $f_{n-1}$ | $f_{n-2}$ | $f_{n-3}$ |
| | ⋮ | ⋮ | ⋮ | ⋮ | ⋮ | ⋮ |

In FIG. 5, 520 denotes an ID storage means described in aspect 10. This ID storage means 520 stores IDs which are given during manufacture, and this means is composed of the communication terminals 207A and 207B, the control circuits 211A and 211B, and the storage circuits 212A and 212B.

Further, 521 denotes an ID inquiry/registration means described in aspect 10. This ID inquiry/registration means 521 is used for mutual inquiry of IDs with another apparatus which is permitted to have communication, and registration of the ID, in advance of use. This means is composed of the detection/registration buttons 206A and 206B, the communication terminals 207A and 207B, the control circuits 211A and 211B, and the storage circuits 212A and 212B.

Further, 522 denotes a frequency setting means described in aspect 11. This frequency setting means 522 always executes the reception mode before the transmission mode, and detects the frequency time tables of all apparatuses which are performing transmission within the same wave area, and performs transmission by using a frequency time table in which the use frequencies are always different from those of these other apparatuses. This means is composed of the RF tuners 203A and 203B, the comparators 225A and 225B, the control circuits 211A and 211B, and the storage circuits 212A and 212B.

Further, 523 denotes a retransmission means described in aspect 11. After the transmission mode is executed, if a transmission signal from the apparatus which has requested communication cannot be detected even when a predetermined period of time has passed, this retransmission means 523 performs transmission again by using a frequency time table different from the above-described frequency time table. This means is composed of the transmission/reception antennae 219A and 219B, the RF tuners 203A and 203B, the comparators 225A and 225B, the control circuits 211A and 211B, and the storage circuits 212A and 212B.

Further, 524 denotes an output stop means described in aspect 12. This output stop means 524 stops output of audio and video when the ID to be permitted to have communication cannot be confirmed in the reception mode. This means is composed of the control circuits 211A and 211B, the comparators 225A and 225B, the storage circuits 212A and 212B, and the audio video output circuits 227A and 227B.

In FIG. 5, the first and second transmission/reception apparatuses 201A and 201B have at least the same units and means as those described for the third embodiment and, furthermore, they are constructed so as to perform at least the same operations as those described for the third embodiment.

When the first and second transmission/reception apparatuses 201A and 201B are manufactured, an ID assignment apparatus is connected to the external apparatus connecting terminals 208A and 208B, and IDs which are unique to the respective apparatuses are input. When these IDs are input, the control units 211A and 211B store these IDs in the storage circuits 212A and 212B, respectively.

Further, in the first and second transmission/reception apparatuses 201A and 201B, registration of another apparatus to be permitted to have communication is performed as follows. After the first transmission/reception apparatus 201A and the second transmission/reception apparatus 201B are connected at the communication terminals 207A and 207B, when one of the detection/registration buttons 206A and 206B is pushed, the control circuit 211A outputs an ID request signal to the control circuit 211B of the second transmission/reception apparatus, through the communication terminal 207.

Hereinafter, the operation will be described on assumption that the detection/registration button 206A was pushed.

The control circuit 211B of the second transmission/receiving apparatus 201B which has received the ID request signal, reads the ID of the self-apparatus which is stored in the storage circuit 212B, and transmits this ID to the first transmission/reception apparatus 201A through the communication terminal 207B.

The control circuit 211A of the first transmission/reception apparatus 201A which has received the ID of the second transmission/reception apparatus 201B, stores this ID in the storage circuit 212A as an ID of another apparatus which is permitted to have communication. At the same time, the control circuit 211A transmits the ID of the self-apparatus to the second transmission/reception apparatus 201B through the communication terminal 207A.

The control circuit 212B of the second transmission/reception apparatus 201B which has received the ID of the first transmission/reception apparatus 201A, stores this Id in the storage circuit 212B as an ID of another apparatus which is permitted to have communication.

Thus, each of the first and second transmission/reception apparatuses 201A and 201B has completed registration of another apparatus which is permitted to have communication.

Figure 10:
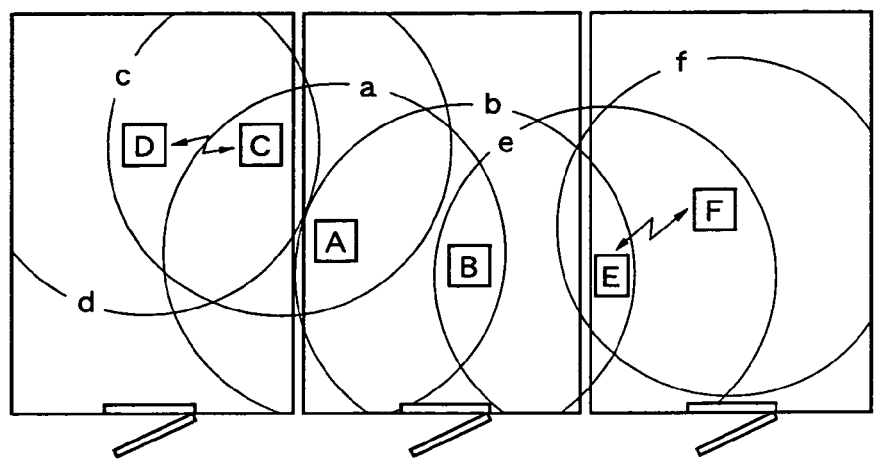
FIG. 10 is a diagram illustrating overlapping of use wave areas of a video transmission apparatus according to a fourth embodiment of the present invention.
Figure 11:
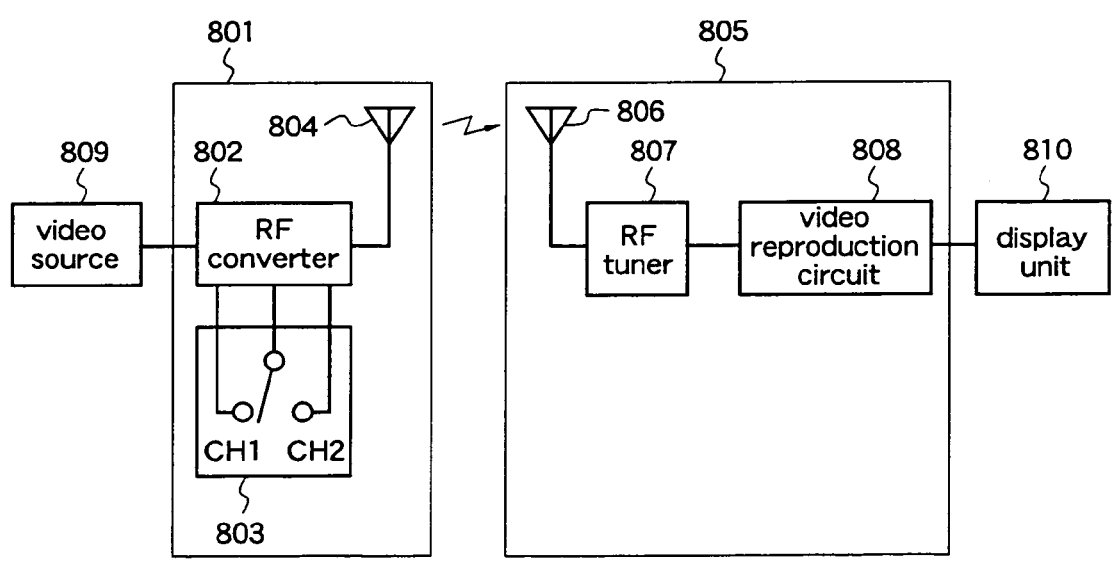
FIG. 11 is a block diagram illustrating the structure of the conventional video transmission apparatus.

With reference to FIG. 10, in each of the following pairs, i.e., a transmission/reception apparatus A and a transmission/reception apparatus B, a transmission/reception apparatus C and a transmission/reception apparatus D, and a transmission/reception apparatus E and a transmission/reception apparatus F, registration of the other transmission/reception apparatus, as an apparatus which is permitted to have communication, has been completed. In the figure, at present, C and D, and E and F are performing communication by using the frequency time tables shown in the first to fourth columns of table 3.

Further, in FIG. 10, a, b, c, d, e, and f denote the reachable areas of waves from the transmission/reception apparatuses A, B, C, D, E, and F, respectively.

A description will be given of the operation in the case where the transmission/reception apparatus A performs calling and video and audio transmission to the transmission/reception apparatus B and, further, the transmission/reception apparatus B performs responding and video and audio transmission to the transmission/reception apparatus A. The transmission/reception apparatus A and the transmission/reception apparatus B correspond to the transmission/reception apparatus 201A and the transmission/reception apparatus 201B shown in FIG. 5, respectively.

In FIG. 5, when a video transmission request signal from an external apparatus is input to the external apparatus control terminal 208 of the transmission/reception apparatus 201A while a video signal from an external apparatus is input to the video input terminal 204A, the control circuit 211A reads the communication frequency list which is stored in the storage circuit 212A, and operates the RF tuner 203A, thereby executing the reception mode in advance of the transmission mode.

In the reception mode, the control circuit 211A of the transmission/reception apparatus 201A rapidly changes the reception frequency of the RF tuner, within the communication frequency list which has been read, according to the frequency changing order shown in the fifth column of table 3, by using, as the frequency changing time, the pseudo synchronous timing which is generated in the control circuit 211A, thereby receiving RF signals from other apparatuses which are performing transmission in the same wave area.

As shown in FIG. 10, around the transmission/reception apparatus A, the transmission/reception apparatuses B and C exist inside the wave reachable area, and the transmission/reception apparatuses D, E, and F exist outside the wave reachable area. Further, around the transmission/reception apparatus B, the transmission/reception apparatuses A and E exist inside the wave reachable area, and the transmission/reception apparatuses C, D, and F exist outside the wave reachable area.

Further, each of the transmission/reception apparatuses C, D, E, and F performing transmission superposes the ID which is unique to the self-apparatus on the part of data 605 of the transmission video signal shown in FIG. 6 and transmits the video signal, in order to mutually detect the other apparatus which is permitted to have communication.

Initially, in the period immediately after the transmission/reception apparatus 201A has started reception, the synchronous timing of the video signal transmitted from the surrounding transmission/reception apparatus and the pseudo synchronous timing at the receiving end do not necessarily coincide with each other. Further, the transmission frequency and the receiving frequency do not necessarily temporally coincide with each other. Therefore, no signal appears in the video output of the RF tuner 203A nor in the output of the comparator 225A.

Accordingly, the control circuit 211A of the second transmission/reception apparatus 201A tries to detect transmission signals from surrounding transmission/reception apparatuses by successively changing the pseudo synchronous timing and the start time of the time table of the reception frequency, while monitoring the output of the comparator 225A.

In the wave reachable area of the transmission/reception apparatus A, the transmission/reception apparatus C is performing transmission by using the frequency time table shown in the first column, i.e., the leftmost column, of table 3. Since the synchronous timing of the video signal transmitted by the transmission/reception apparatus C and the cycle of the time table of the transmission frequency are constant, the transmission/reception apparatus A succeeds in detecting the transmission signal from the transmission/reception apparatus C after predetermined trials.

When detection of the transmission signal has succeeded, the transmission/reception apparatus A changes the synchronous timing of the received video signal extracted by the comparator 225A to the pseudo synchronous timing and uses it. At the same time, the apparatus A extracts the part of data 605 shown in FIG. 6 by A using the comparator 225A, and reads the ID of the transmission/reception apparatus which transmits this signal.

When the read ID is not the apparatus which is permitted to have communication, the frequency time table which is currently used is stored in the storage circuit 212A, as a list being used by surrounding another group of transmission/reception apparatuses.

The transmission/reception apparatus A continuously tries to detect transmission signals from surrounding transmission/reception apparatuses, to know whether or not there exists still another apparatus performing transmission in the wave reachable area, by successively changing the pseudo synchronous timing and the start time of the time table of the reception frequency, while monitoring the output of the comparator 225A.

After trying to detect transmission signals while thoroughly changing the pseudo synchronous timing and the start time of the time table of the reception frequency, when it is confirmed that there is no more apparatus than the transmission/reception apparatus C around the transmission/reception apparatus A, the control circuit 211A of the apparatus A spreads the power spectrum by rapidly changing the RF frequency of the RF converter 202A by using a list other than the stored list being used by another group, for example, the frequency time table in the third column of table 3 and, thereafter, reduces the attenuation of the variable attenuator 218A to start transmission.

On the other hand, in FIG. 5, when a video reception request signal from an external apparatus is input to the external apparatus control terminal 208B of the transmission/reception apparatus 201B, the control circuit 208B of the transmission/reception apparatus 201B reads the communication frequency list which is stored in the storage circuit 212B, and operates the RF tuner 203B.

Further, the control circuit 211B of the transmission/reception apparatus 201B rapidly changes the reception frequency of the RF tuner 203, within the range of the communication frequency list which has been read, according to the frequency changing order shown in the sixth column of table 3, by using, as the frequency changing timing, the pseudo synchronous timing generated in the control circuit 211B, thereby receiving the RF signal from the transmission/reception apparatus A.

In the period immediately after the transmission/reception apparatus B has started reception, the synchronous timing of the video signal at the transmitting end and the pseudo synchronous timing at the receiving end do not necessarily coincide with each other. Further, the transmission frequency and the receiving frequency do not necessarily temporally coincide with each other. Therefore, no signal appears in the video output of the RF tuner 203B nor in the output of the comparator 225B.

Accordingly, the control circuit 211B of the transmission/reception apparatus 201B tries to detect the transmission signal from the transmission/reception apparatus A by successively changing the pseudo synchronous timing and the start time of the time table of the reception frequency while monitoring the output of the comparator 225B.

Now it is assumed that, in the wave reachable area of the transmission/reception apparatus B, both of the transmission/reception apparatus A and the transmission reception apparatus E perform transmission by using the frequency time table shown in the third column of table 3. Since the synchronous timings of the video signals transmitted from the transmission/reception apparatuses A and E and the cycle of the time table of the transmission frequency are constant, the transmission/reception apparatus B detects the transmission signals from the transmission/reception apparatuses A and E after predetermined trials.

When the transmission/reception apparatus B has succeeded in detecting the transmission signals, it tries to extract the synchronous timings of the received video signals by using the comparator 225B. However, since the received signals from the transmission/reception apparatuses A and E overlap and interfere with each other, a synchronous signal of normal cycle is not obtained. Accordingly, the transmission/reception apparatus B does not perform transmission for responding but enters into the operation to detect another transmission signal.

In the transmission/reception apparatus A, although the reception mode is continued by the RF tuner after transmission has been started, the RF tuner cannot detect a response signal from the transmission/reception apparatus B which has requested communication even when a predetermined period of time has passed. Therefore, the transmission/reception apparatus A resumes transmission by using a frequency time table which is different from the list being used by another group and different from the list which is currently being used, for example, the frequency time table shown in the fifth column of table 3.

Since the transmission/reception apparatus B continues detection of another transmission signal, it normally detects a transmission signal from the transmission/reception apparatus A which uses a frequency time table different from that of the transmission/reception apparatus E.

When the transmission/reception apparatus B has succeeded in detection, it changes the synchronous timing of the received video signal extracted by the comparator 225B to the pseudo synchronous timing and uses it. Simultaneously, the transmission/reception apparatus B extracts the part of data 605 shown in FIG. 6 by using the comparator 225B, and reads the ID of the transmission/reception apparatus which transmits this signal.

Then, the transmission/reception apparatus B confirms, from the read ID, that the signal currently being received is a signal from the transmission/reception apparatus A which is permitted to have communication.

Further, in the transmission/reception apparatus B, when detection of the transmission signal from the transmission/reception apparatus A and confirmation of the ID have been completed, the control circuit 211B reads the communication frequency list stored in the storage circuit 212B, and sets the attenuation of the variable attenuator 218B at the maximum and, thereafter, operates the RF converter 202B.

Furthermore, the control circuit 211B rapidly changes the RF frequency of the RF converter 202B, within the range of the read communication frequency list, by using, for example, the frequency time table shown in the sixth column of table 3, thereby spreading the power spectrum. Thereafter, the control circuit 211B reduces the attenuation of the variable attenuator 218B to start transmission.

Further, the communication frequency is changed according to the synchronous timing of the video signal transmitted from the transmission/reception apparatus A which has completed detection.

On the other hand, since the transmission/reception apparatus A continues the reception mode by using the RF tuner, it detects a response signal from the transmission/reception apparatus B.

As shown in table 3, the response signal from the transmission/reception apparatus B is different from the frequency time table which is being used by another group of transmission/reception apparatuses in the wave reachable area of the transmission/reception apparatus A and, therefore, favorable reception is achieved.

When the transmission/reception apparatus A has succeeded in detecting the transmission signal, it tries to extract the response signal which is superposed on the received video signal. Since a normal response signal is confirmed from the received video signal which is in favorable reception state, the transmission/reception apparatus A transmits a response indicating "duplex communication succeeded" by superposing it on the video signal which is already being transmitted.

When the transmission/reception apparatus B confirms the response signal indicating "duplex communication succeeded", it fixes the frequency time table to be used thereafter to assure the transmission path.

In the above-mentioned process, when the frequency time table used by the transmission/reception apparatus B coincides with, for example, the frequency time table in the first column of table 3, the transmission/reception apparatus A cannot confirm the response signal from the apparatus B and, therefore, it does not transmit the response signal indicating "duplex communication succeeded". Since the transmission/reception apparatus B cannot confirm the response signal indicating "duplex communication succeeded" from the transmission/reception apparatus A even when a predetermined period of time has passed, it starts transmission by using still another frequency time table, for example, the frequency time table in the sixth column of table 3, thereby returning into the above-described favorable reception state.

Further, in the above-described process, when the group of transmission/reception apparatuses C and D and the group of transmission/reception apparatuses A and B use different communication frequency lists, no mutual interference occurs substantially because mutual interference decreases according to the ratio of time in which these groups use the same frequency simultaneously, and this case is identical to the state where no transmission/reception apparatus group performing transmission exists in the neighborhood, resulting in favorable communication.

Thus, radio interference is prevented in a multiple dwelling house in which the used wave areas may overlap uncertainly.

Further, in the above-described process, there is a possibility that the transmission/reception apparatuses A and B detect the transmission signals from the transmission/reception apparatuses C and E, respectively. However, when it cannot be confirmed that the ID which is superposed on the received video signal is transmitted from the other apparatus which is permitted to have communication, no audio and video signals are output from the audio video output circuits 227A and 227B shown in FIG. 5.

Thereby, regardless of the user's intention, interception can be prevented.

As described above, according to the transmission apparatus of the fourth embodiment, in the transmission apparatus according to the second or third embodiment, an ID which is given to the apparatus during manufacture is stored, and the apparatus performs mutual inquiry of IDs with another apparatus to be permitted to have communication and registers the ID, in advance of use. Therefore, it is possible to realize a video transmission apparatus which solves radio interference and prevents interception in a multiple dwelling house in which the use wave areas may overlap uncertainly.

Further, the reception mode is always executed in advance of the transmission mode to detect the frequency time tables of all the apparatuses performing transmission in the same wave area, and transmission is performed by using a frequency time table the use frequency of which is always different from those of these apparatuses. If a transmission signal from the other apparatus which has requested communication cannot be detected even when a predetermined period of time has passed after executing the transmission mode, retransmission is performed by using a frequency time table which is different from the above-described frequency time table. Therefore, it is possible to realize a video transmission apparatus which solves ratio interference in a multiple dwelling house in which the use wave areas may overlap uncertainly.

Further, in the reception mode, when the ID which is permitted to have communication cannot be confirmed, no audio and video signals are output. Therefore, it is possible to realize a video transmission apparatus which prevents interception in a multiple dwelling house in which the use wave areas may overlap uncertainly.

Accordingly, in a multiple dwelling house in which the use wave areas may overlap uncertainly, radio interference is solved and interception is prevented, and therefore, the transmission apparatus can be applied to an interior wireless terminal of a front-door visual phone or a visual telephone.

While in this fourth embodiment a digitized audio signal is subjected to PCM, other compressive coding methods may be used.

Further, while in this fourth embodiment the NTSC system is used as a standard television signal, the PAL system or the SECAM system may be used.

APPLICABILITY IN INDUSTORY

According to a transmission apparatus of aspect 1, a relay station is provided between a master station and a slave station which transmit video or audio by utilizing a minute-power wave, a transmission signal from the master station includes information indicating the address of the slave station and a frequency at which the self-station receives a signal from the relay station, the relay station modulates the frequency of the wave received from the master station to a different frequency and outputs it, and the slave station recognizes that the transmission signal is a signal directed to the self-station and then modulates the minute-power wave to the frequency specified by the relay station, thereby establishing a transmission path between the master station and the slave station. Therefore, this apparatus enables transmission in the case where the distance between the master station and the slave station exceeds the reachable range of the minute-power wave.

According to a transmission apparatus of aspect 2, in the transmission apparatus of aspect 1, a standard television signal is used as the transmission signal in the forward path from the master station to the slave station, and a PCM audio signal and the information indicating the address of the slave station and the reception frequency specified by the self-station are superposed on a video signal during the vertical blanking period of the video signal. Therefore, this apparatus enables transmission in the case where the distance between the master station and the slave station exceeds the reachable range of the minute-power wave. Further, when the standard television signal is used as the transmission signal, the PCM audio signal and the information indicating the address of the slave station and the reception frequency specified by the self-station can be superposed to the transmission signal.

According to a transmission apparatus of aspect 3, this transmission apparatus is provided with a transmitter having an RF converter which generates a standard television signal and a receiver having an RE tuner which receives the standard television signal, frequencies which can be used for video transmission are detected within the reception band of the RF tuner in advance of use, the detected frequencies are registered in both of the transmitter and the receiver, and the power spectrum is spread by changing the frequency within the range of the communication frequency list to perform spread spectrum communication. Therefore, it is possible to obtain a transmission apparatus which reduces the influence of multi-path.

According to a transmission apparatus of aspect 4, in the transmission apparatus of aspect 3, the transmission power is automatically changed in accordance with the use frequency band width so as to keep the power density per unit band width constant. Therefore, this apparatus enables transmission at a minute-power wave level which does not interfere with reception of an existing radio communication apparatus.

According to a transmission apparatus of aspect 5, in the transmission apparatus of aspect 3 or 4, the frequency during the communication is changed in synchronization with the synchronous timing of the video signal. Therefore, disordering of the video signal due to the frequency change can be reduced, resulting in video transmission with improved image quality.

According to a transmission apparatus of aspect 6, in the transmission apparatus according to any of aspects 3 to 5, a control signal is transmitted by superposing it on the video signal in the blanking period. Therefore, it is possible to control the operation of the receiving apparatus from the transmission apparatus.

According to a transmission apparatus of aspect 7, in the transmission apparatus according to any of aspects 3 to 6, an audio signal is subjected to PCM, and the PCM audio signal is transmitted by superposing it on the video signal in the blanking period. Therefore, noise in the audio signal due to the frequency change is removed, resulting in transmission with improved sound quality.

According to a transmission apparatus of aspect 8, first and second transmission/reception apparatuses are constructed by using the transmission apparatus according to any of aspects 3 to 8, and the frequency is changed within the communication frequency list, from the higher frequency to the lower frequency or in the reverse order, by using different frequency time tables for the first and second transmission/reception apparatuses. Therefore, mutual control is realized between the respective transmission/reception apparatuses.

According to a transmission apparatus of aspect 9, in the transmission apparatus of aspect 8, the previously registered communication frequency list is used when starting the communication and, after communication has been started, a second communication frequency list which is obtained by duplicating the registered communication frequency list is desirably updated according to the information as to whether the communication is good or bad. Therefore, the influence of multi-path is solved.

According to a transmission apparatus of aspect 10, in the transmission apparatus according to any of aspects 3 to 9, an ID which is given to the apparatus during manufacture is stored, and mutual inquiry of IDs is performed with another transmission apparatus which is permitted to have communication in advance of use, and then the ID is registered. Therefore, radio interference between the transmission apparatuses is avoided.

According to a transmission apparatus of aspect 11, in the transmission apparatus of aspect 10, the reception mode is executed in advance of the transmission mode to detect the frequency time tables of all other transmission apparatuses which are performing transmission within the same wave area, and transmission is performed by using a frequency time table the use frequency of which is always different from those of these other transmission apparatuses. When a transmission signal from another apparatus which has requested communication cannot be detected even when a predetermined period of time has passed after starting the transmission mode, retransmission is performed by using a frequency time table different from the frequency time table which has been used. Therefore, radio interference between the transmission apparatuses is avoided.

According to a transmission apparatus of aspect 12, in the transmission apparatus of aspect 10 or 11, when the ID which is permitted to have communication cannot be confirmed in the reception mode, output of audio or video is stopped. Therefore, interception is avoided.

According to a transmission method of aspect 13, a relay station is provided between a master station and a slave station which transmit video or audio by utilizing a minute-power wave, a transmission signal from the master station includes information indicating the address of the slave station and a frequency at which the self-station receives a signal from the relay station, the relay station modulates the frequency of the wave received from the master station to a different frequency and outputs it, and the slave station recognizes that the transmission signal is a signal directed to the self-station and then modulates the minute-power wave to the frequency specified by the relay station, thereby establishing a transmission path between the master station and the slave station. Therefore, this method enables transmission in the case where the distance between the master station and the slave station exceeds the reachable range of the minute-power wave.

According to a transmission method of aspect 14, in the transmission method of aspect 13, a standard television signal is used as the transmission signal in the forward path from the master station to the slave station, and a PCM audio signal and the information indicating the address of the slave station and the reception frequency specified by the self-station are superposed on a video signal during the vertical blanking period of the video signal. Therefore, this method enables transmission in the case where the distance between the master station and the slave station exceeds the reachable range of the minute-power wave. Further, when the standard television signal is used as the transmission signal, the PCM audio signal and the information indicating the address of the slave station and the reception frequency specified by the self-station can be superposed o the transmission signal.

According to a transmission method of aspect 15, this method uses a transmitter having an RF converter which generates a standard television signal and a receiver having an RF tuner which receives the standard television signal, frequencies which can be used for video transmission are detected within the reception band of the RF tuner in advance of use, the detected frequencies are registered in both of the transmitter and the receiver, and the power spectrum is spread by changing the frequency within the range of the communication frequency list to perform spread spectrum communication. Therefore, it is possible to obtain a transmission method which reduces the influence of multi-path.

According to a transmission method of aspect 16, in the transmission method of aspect 15, the transmission power is automatically changed in accordance with the use frequency band width so as to keep the power density per unit band width constant. Therefore, this method enables transmission at a minute-power wave level which does not interfere with reception of an existing radio communication apparatus.

According to a transmission apparatus of aspect 17, in the transmission method of aspect 15 or 16, the frequency during the communication is changed in synchronization with the synchronous timing of the video signal. Therefore, disordering of the video signal due to the frequency change can be reduced, resulting in video transmission with improved image quality.

According to a transmission method of aspect 18, in the transmission method according to any of aspects 15 to 17, a control signal is transmitted by superposing it on the video signal in the blanking period. Therefore, it is possible to control the operation of the receiving apparatus from the transmission apparatus.

According to a transmission method of aspect 19, in the transmission method according to any of aspects 15 to 18, an audio signal is subjected to PCM, and the PCM audio signal is transmitted by superposing it on the video signal in the blanking period. Therefore, noise in the audio signal due to the frequency change is removed, resulting in transmission with improved sound quality.

According to a transmission method of aspect 20, first and second transmission/reception apparatuses each performing the transmission method according to any of aspects 15 to 19 are provided, and the frequency is changed within the communication frequency list, from the higher frequency to the lower frequency or in the reverse order, by using different frequency time tables for the first and second transmission/reception apparatuses. Therefore, mutual control is realized between the respective transmission/reception apparatuses.

According to a transmission method of aspect 21, in the transmission method of aspect 20, the previously registered communication frequency list is used when starting the communication and, after communication has been started, a second communication frequency list which is obtained by duplicating the registered communication frequency list is desirably updated according to the information as to whether the communication is good or bad. Therefore, the influence of multi-path is solved.

According to a transmission method of aspect 22, in the transmission method according to any of aspects 15 to 21, an ID which is given to the apparatus during manufacture is stored, and mutual inquiry of IDs is performed with another transmission apparatus which is permitted to have communication in advance of use, and then the ID is registered. Therefore, radio interference between the transmission apparatuses is avoided.

According to a transmission method of aspect 23, in the transmission method of aspect 22, the reception mode is executed in advance of the transmission mode to detect the frequency time tables of all other transmission apparatuses which are performing transmission within the same wave area, and transmission is performed by using a frequency time table the use frequency of which is always different from those of these other transmission apparatuses. When a transmission signal from another apparatus which has requested communication cannot be detected even when a predetermined period of time has passed after starting the transmission mode, retransmission is performed by using a frequency time table different from the frequency time table which has been used. Therefore, radio interference between the transmission apparatuses is avoided.

According to a transmission method of aspect 24, in the transmission method of aspect 22 or 23, when the ID which is permitted to have communication cannot be confirmed in the reception mode, output Of audio or video is stopped. Therefore, interception is avoided.

The invention claimed is:

1. A transmission apparatus comprising:
a master station for transmitting and receiving a video or audio transmission signal by utilizing a first minute-power wave, said transmission signal comprising slave station address information and master station receiving frequency information indicating a frequency at which a master station can receive a signal from a relay station;
a slave station for transmitting and receiving a video or audio transmission signal utilizing a second minute-power wave; and
a relay station located between the master station and the slave station, said master and slave stations located apart from each other by a distance longer than the reachable range of a first minute-power wave, wherein said relay station is for receiving a first minute-power signal (f1) from modulating at the master station, modulating it to a different frequency (f2), and transmitting the modulated first minute-power signal to the slave station;

said relay station is for receiving from the master station, return frequency information (f0) as part of a first minute-power signal, demodulating a portion of a second minute-power signal received from the slave station, modulating the demodulated portion at the master station return frequency (f0), and transmitting the modulated portion of the second minute-power signal to the master station, thereby establishing a return transmission path between the relay station and the master station;

said relay station is for transmitting information about a relay station receiving frequency at which the relay station receives a signal from the slave station;

said slave station is for recognizing that a transmission signal is a signal directed to said slave station; and said slave station is for modulating and transmitting a response signal comprising video or audio information at said relay station receiving frequency, thereby establishing a transmission path between the master station and the slave station.

2. The transmission apparatus as described in claim 1, wherein:
said master station is for transmitting a transmission signal comprising:
a standard television signal in the forward path from the master station to the slave station; and
a PCM audio signal and the information indicating the address of the slave station and the reception frequency specified by the slave station superposed on a video signal during the vertical blanking period of the video signal.

3. A transmission method for mutually transmitting video and audio transmission signals between a master station and a slave station by utilizing a minute-power wave, comprising:
locating a relay station between the master station and the slave station which are located apart from each other by a distance longer than the reachable range of the minute-power wave;
generating a transmission signal from the master station comprising, in addition to original audio or video information, information indicating an address of the slave station, and information indicating a frequency at which the master station receives a signal from the relay station;
modulating by said relay station the frequency of the minute-power wave received from the master station to a different frequency and outputting said different frequency;
transmitting by said relay station information about a frequency at which the relay station receives a signal from the slave station; and
modulating by the slave station the minute-power wave to the frequency specified by the relay station and transmitting the video or audio, thereby establishing a transmission path between the master station and the slave station, when the slave station recognizes that the transmission signal is a signal directed to the slave station.

4. The transmission method as described in claim 3, further comprising:

using a standard television signal as the transmission signal in the forward path from the master station to the slave station; and superposing a PCM audio signal and the information indicating the destination station and the reception frequency specified by the slave station on a video signal during the vertical blanking period of the video signal.

* * * * *

UNITED STATES PATENT AND TRADEMARK OFFICE
CERTIFICATE OF CORRECTION

PATENT NO.         : 7,209,746 B1
APPLICATION NO.    : 09/423356
DATED              : April 24, 2007
INVENTOR(S)        : Hideki Kirino and Tetsuo Hiraga It is certified that error appears in the above-identified patent and that said Letters Patent is hereby corrected as shown below:

Title Page:
(86) Section 371(c)(1), (2), (4) Date:  delete "Jun. 21, 2000" and insert
--Jan. 21, 2000--.

Column 38, line 2, delete "modulating at".

Signed and Sealed this

Seventh Day of August, 2007

JON W. DUDAS
*Director of the United States Patent and Trademark Office*